United States Patent
Song et al.

(10) Patent No.: US 10,275,898 B1
(45) Date of Patent: Apr. 30, 2019

(54) WEDGE-BASED LIGHT-FIELD VIDEO CAPTURE

(71) Applicant: Google LLC, Mountain View, CA (US)

(72) Inventors: Alex Song, San Jose, CA (US); Jonathan Frank, Mountain View, CA (US); Julio C. Hernandez Zaragoza, Mountain View, CA (US); Orin Green, Nipomo, CA (US); Steve Cooper, Santa Cruz, CA (US); Ariel Braunstein, San Francisco, CA (US); Tim Milliron, Mountain View, CA (US); Colvin Pitts, Snohomish, WA (US); Yusuke Yasui, Yokohama (JP); Saeid Shahhosseini, San Mateo, CA (US); Bipeng Zhang, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 11 days.

(21) Appl. No.: 15/590,951

(22) Filed: May 9, 2017

Related U.S. Application Data

(63) Continuation-in-part of application No. 15/582,237, filed on Apr. 28, 2017, which is a continuation-in-part
(Continued)

(51) Int. Cl.
*G06T 7/80* (2017.01)
*G06T 15/20* (2011.01)
(Continued)

(52) U.S. Cl.
CPC .............. *G06T 7/557* (2017.01); *G06T 7/593* (2017.01); *G06T 7/85* (2017.01); *G06T 15/20* (2013.01);
(Continued)

(58) Field of Classification Search
CPC ........... G06T 2207/10016; G06T 15/00; G06T 15/20; G06T 2207/20212; G06T 2200/32; G06T 3/0018; G06T 7/292; G06T 7/55
See application file for complete search history.

(56) References Cited

U.S. PATENT DOCUMENTS

| | | | |
|---|---|---|---|
| 725,567 | A | 4/1903 | Ives |
| 4,383,170 | A | 5/1983 | Takagi et al. |

(Continued)

FOREIGN PATENT DOCUMENTS

| | | |
|---|---|---|
| CN | 101226292 | 7/2008 |
| CN | 101309359 | 11/2008 |

(Continued)

OTHER PUBLICATIONS

Shade, Jonathan, et al., "Layered Depth Images", SIGGRAPH 98, pp. 1-2.
(Continued)

*Primary Examiner* — Haixia Du

(57) ABSTRACT

A combined video of a scene may be generated for applications such as virtual reality or augmented reality. In one method, a camera system may be oriented at a first orientation and used to capture first video of a first portion of the scene. The camera system may then be rotated to a second orientation and used to capture second video of a second portion of the scene that is offset from the first portion such that the first video and the second video each have an overlapping video portion depicting an overlapping portion of the scene in which the first portion and the second portion of the scene overlap with each other. The first and second portions may be combined together to generate the combined video, which may depict the first and second portions substantially without duplicative inclusion of the overlapping video portion.

24 Claims, 15 Drawing Sheets

Related U.S. Application Data of application No. 15/084,326, filed on Mar. 29, 2016, now Pat. No. 10,085,005.

(60) Provisional application No. 62/148,460, filed on Apr. 16, 2015, provisional application No. 62/148,055, filed on Apr. 15, 2015, provisional application No. 62/359,022, filed on Jul. 6, 2016, provisional application No. 62/333,637, filed on May 9, 2016.

(51) Int. Cl.
  *G06T 7/557* (2017.01)
  *G06T 7/593* (2017.01)

(52) U.S. Cl.
  CPC .............. *G06T 2207/10021* (2013.01); *G06T 2207/10028* (2013.01); *G06T 2207/30204* (2013.01)

(56) References Cited

U.S. PATENT DOCUMENTS

| | | |
|---|---|---|
| 4,661,986 A | 4/1987 | Adelson |
| 4,694,185 A | 9/1987 | Weiss |
| 4,920,419 A | 4/1990 | Easterly |
| 5,076,687 A | 12/1991 | Adelson |
| 5,077,810 A | 12/1991 | D'Luna |
| 5,251,019 A | 10/1993 | Moorman et al. |
| 5,282,045 A | 1/1994 | Mimura et al. |
| 5,499,069 A | 3/1996 | Griffith |
| 5,572,034 A | 11/1996 | Karellas |
| 5,610,390 A | 3/1997 | Miyano |
| 5,729,471 A | 3/1998 | Jain et al. |
| 5,748,371 A | 5/1998 | Cathey, Jr. et al. |
| 5,757,423 A | 5/1998 | Tanaka et al. |
| 5,818,525 A | 10/1998 | Elabd |
| 5,835,267 A | 11/1998 | Mason et al. |
| 5,907,619 A | 5/1999 | Davis |
| 5,949,433 A | 9/1999 | Klotz |
| 5,974,215 A | 10/1999 | Bilbro et al. |
| 6,005,936 A | 12/1999 | Shimizu et al. |
| 6,021,241 A | 2/2000 | Bilbro et al. |
| 6,023,523 A | 2/2000 | Cohen et al. |
| 6,028,606 A | 2/2000 | Kolb et al. |
| 6,034,690 A | 3/2000 | Gallery et al. |
| 6,061,083 A | 5/2000 | Aritake et al. |
| 6,061,400 A | 5/2000 | Pearlstein et al. |
| 6,069,565 A | 5/2000 | Stern et al. |
| 6,075,889 A | 6/2000 | Hamilton, Jr. et al. |
| 6,084,979 A | 7/2000 | Kanade et al. |
| 6,091,860 A | 7/2000 | Dimitri |
| 6,097,394 A | 8/2000 | Levoy et al. |
| 6,115,556 A | 9/2000 | Reddington |
| 6,137,100 A | 10/2000 | Fossum et al. |
| 6,169,285 B1 | 1/2001 | Pertrillo et al. |
| 6,201,899 B1 | 3/2001 | Bergen |
| 6,221,687 B1 | 4/2001 | Abramovich |
| 6,320,979 B1 | 11/2001 | Melen |
| 6,424,351 B1 | 7/2002 | Bishop et al. |
| 6,448,544 B1 | 9/2002 | Stanton et al. |
| 6,466,207 B1 | 10/2002 | Gortler et al. |
| 6,476,805 B1 | 11/2002 | Shum et al. |
| 6,479,827 B1 | 11/2002 | Hamamoto et al. |
| 6,483,535 B1 | 11/2002 | Tamburrino et al. |
| 6,529,265 B1 | 3/2003 | Henningsen |
| 6,577,342 B1 | 6/2003 | Webster |
| 6,587,147 B1 | 7/2003 | Li |
| 6,597,859 B1 | 7/2003 | Leinhardt et al. |
| 6,606,099 B2 | 8/2003 | Yamada |
| 6,658,168 B1 | 12/2003 | Kim |
| 6,674,430 B1 | 1/2004 | Kaufman et al. |
| 6,687,419 B1 | 2/2004 | Atkin |
| 6,768,980 B1 | 7/2004 | Meyer et al. |
| 6,785,667 B2 | 8/2004 | Orbanes et al. |
| 6,833,865 B1 | 12/2004 | Fuller et al. |
| 6,842,297 B2 | 1/2005 | Dowski, Jr. et al. |
| 6,900,841 B1 | 5/2005 | Mihara |
| 6,924,841 B2 | 8/2005 | Jones |
| 6,927,922 B2 | 8/2005 | George et al. |
| 7,015,954 B1 | 3/2006 | Foote et al. |
| 7,025,515 B2 | 4/2006 | Woods |
| 7,034,866 B1 | 4/2006 | Colmenarez et al. |
| 7,079,698 B2 | 7/2006 | Kobayashi |
| 7,102,666 B2 | 9/2006 | Kanade et al. |
| 7,164,807 B2 | 1/2007 | Morton |
| 7,206,022 B2 | 4/2007 | Miller et al. |
| 7,239,345 B1 | 7/2007 | Rogina |
| 7,286,295 B1 | 10/2007 | Sweatt et al. |
| 7,304,670 B1 | 12/2007 | Hussey et al. |
| 7,329,856 B2 | 2/2008 | Ma et al. |
| 7,336,430 B2 | 2/2008 | George |
| 7,417,670 B1 | 8/2008 | Linzer et al. |
| 7,469,381 B2 | 12/2008 | Ording |
| 7,477,304 B2 | 1/2009 | Hu |
| 7,587,109 B1 | 9/2009 | Reininger |
| 7,620,309 B2 | 11/2009 | Georgiev |
| 7,623,726 B1 | 11/2009 | Georgiev |
| 7,633,513 B2 | 12/2009 | Kondo et al. |
| 7,683,951 B2 | 3/2010 | Aotsuka |
| 7,687,757 B1 | 3/2010 | Tseng et al. |
| 7,723,662 B2 | 5/2010 | Levoy et al. |
| 7,724,952 B2 | 5/2010 | Shum et al. |
| 7,748,022 B1 | 6/2010 | Frazier |
| 7,847,825 B2 | 12/2010 | Aoki et al. |
| 7,936,377 B2 | 5/2011 | Friedhoff et al. |
| 7,936,392 B2 | 5/2011 | Ng et al. |
| 7,941,634 B2 | 5/2011 | Georgi |
| 7,945,653 B2 | 5/2011 | Zuckerberg et al. |
| 7,949,252 B1 | 5/2011 | Georgiev |
| 7,982,776 B2 | 7/2011 | Dunki-Jacobs et al. |
| 8,013,904 B2 | 9/2011 | Tan et al. |
| 8,085,391 B2 | 12/2011 | Machida et al. |
| 8,106,856 B2 | 1/2012 | Matas et al. |
| 8,115,814 B2 | 2/2012 | Iwase et al. |
| 8,155,456 B2 | 4/2012 | Babacan |
| 8,155,478 B2 | 4/2012 | Vitsnudel et al. |
| 8,189,089 B1 | 5/2012 | Georgiev et al. |
| 8,228,417 B1 | 7/2012 | Georgiev et al. |
| 8,248,515 B2 | 8/2012 | Ng et al. |
| 8,259,198 B2 | 9/2012 | Cote et al. |
| 8,264,546 B2 | 9/2012 | Witt |
| 8,279,325 B2 | 10/2012 | Pitts et al. |
| 8,289,440 B2 | 10/2012 | Knight et al. |
| 8,290,358 B1 | 10/2012 | Georgiev |
| 8,310,554 B2 | 11/2012 | Aggarwal et al. |
| 8,315,476 B1 | 11/2012 | Georgiev et al. |
| 8,345,144 B1 | 1/2013 | Georgiev et al. |
| 8,400,533 B1 | 3/2013 | Szedo |
| 8,400,555 B1 | 3/2013 | Georgiev et al. |
| 8,427,548 B2 | 4/2013 | Lim et al. |
| 8,442,397 B2 | 5/2013 | Kang et al. |
| 8,446,516 B2 | 5/2013 | Pitts et al. |
| 8,494,304 B2 | 7/2013 | Venable et al. |
| 8,531,581 B2 | 9/2013 | Shroff |
| 8,542,933 B2 | 9/2013 | Venkataraman et al. |
| 8,559,705 B2 | 10/2013 | Ng |
| 8,570,426 B2 | 10/2013 | Pitts et al. |
| 8,577,216 B2 | 11/2013 | Li et al. |
| 8,581,998 B2 | 11/2013 | Ohno |
| 8,589,374 B2 | 11/2013 | Chaudhri |
| 8,593,564 B2 | 11/2013 | Border et al. |
| 8,605,199 B2 | 12/2013 | Imai |
| 8,614,764 B2 | 12/2013 | Pitts et al. |
| 8,619,082 B1 | 12/2013 | Ciurea et al. |
| 8,629,930 B2 | 1/2014 | Brueckner et al. |
| 8,665,440 B1 | 3/2014 | Kompaniets et al. |
| 8,675,073 B2 | 3/2014 | Aagaard et al. |
| 8,724,014 B2 | 5/2014 | Ng et al. |
| 8,736,710 B2 | 5/2014 | Spielberg |
| 8,736,751 B2 | 5/2014 | Yun |
| 8,749,620 B1 | 6/2014 | Pitts et al. |
| 8,750,509 B2 | 6/2014 | Renkis |
| 8,754,829 B2 | 6/2014 | Lapstun |
| 8,760,566 B2 | 6/2014 | Pitts et al. |

(56) References Cited

U.S. PATENT DOCUMENTS

| | | |
|---|---|---|
| 8,768,102 B1 | 7/2014 | Ng et al. |
| 8,797,321 B1 | 8/2014 | Bertolami et al. |
| 8,811,769 B1 | 8/2014 | Pitts et al. |
| 8,831,377 B2 | 9/2014 | Pitts et al. |
| 8,848,970 B2 | 9/2014 | Aller et al. |
| 8,860,856 B2 | 10/2014 | Wetsztein et al. |
| 8,879,901 B2 | 11/2014 | Caldwell et al. |
| 8,903,232 B1 | 12/2014 | Caldwell |
| 8,908,058 B2 | 12/2014 | Akeley et al. |
| 8,948,545 B2 | 2/2015 | Akeley et al. |
| 8,953,882 B2 | 2/2015 | Lim |
| 8,971,625 B2 | 3/2015 | Pitts et al. |
| 8,976,288 B2 | 3/2015 | Ng et al. |
| 8,988,317 B1 | 3/2015 | Liang et al. |
| 8,995,785 B2 | 3/2015 | Knight et al. |
| 8,997,021 B2 | 3/2015 | Liang et al. |
| 9,001,226 B1 | 4/2015 | Ng et al. |
| 9,013,611 B1 | 4/2015 | Szedo |
| 9,106,914 B2 | 8/2015 | Doser |
| 9,172,853 B2 | 10/2015 | Pitts et al. |
| 9,184,199 B2 | 11/2015 | Pitts et al. |
| 9,201,193 B1 | 12/2015 | Smith |
| 9,210,391 B1 | 12/2015 | Mills |
| 9,214,013 B2 | 12/2015 | Venkataraman et al. |
| 9,294,662 B2 | 3/2016 | Vondran, Jr. et al. |
| 9,300,932 B2 | 3/2016 | Knight et al. |
| 9,305,375 B2 | 4/2016 | Akeley |
| 9,305,956 B2 | 4/2016 | Pittes et al. |
| 9,386,288 B2 | 7/2016 | Akeley et al. |
| 9,392,153 B2 | 7/2016 | Myhre et al. |
| 9,419,049 B2 | 8/2016 | Pitts et al. |
| 9,467,607 B2 | 10/2016 | Ng et al. |
| 9,497,380 B1 | 11/2016 | Jannard et al. |
| 9,607,424 B2 | 3/2017 | Ng et al. |
| 9,628,684 B2 | 4/2017 | Liang et al. |
| 9,635,332 B2 | 4/2017 | Carroll et al. |
| 9,639,945 B2 | 5/2017 | Oberheu et al. |
| 9,647,150 B2 | 5/2017 | Blasco Claret |
| 9,681,069 B2 | 6/2017 | El-Ghoroury et al. |
| 9,774,800 B2 | 9/2017 | El-Ghoroury et al. |
| 9,858,649 B2 | 1/2018 | Liang et al. |
| 9,866,810 B2 | 1/2018 | Knight et al. |
| 9,900,510 B1 | 2/2018 | Karafin et al. |
| 9,979,909 B2 | 5/2018 | Kuang et al. |
| 2001/0048968 A1 | 12/2001 | Cox et al. |
| 2001/0053202 A1 | 12/2001 | Mazess et al. |
| 2002/0001395 A1 | 1/2002 | Davis et al. |
| 2002/0015048 A1 | 2/2002 | Mister |
| 2002/0061131 A1 | 5/2002 | Sawhney |
| 2002/0109783 A1 | 8/2002 | Hayashi |
| 2002/0159030 A1 | 10/2002 | Frey et al. |
| 2002/0199106 A1 | 12/2002 | Hayashi |
| 2003/0043270 A1* | 3/2003 | Rafey ............... H04N 5/222 348/157 |
| 2003/0081145 A1 | 5/2003 | Seaman et al. |
| 2003/0103670 A1 | 6/2003 | Schoelkopf et al. |
| 2003/0117511 A1 | 6/2003 | Belz et al. |
| 2003/0123700 A1 | 7/2003 | Wakao |
| 2003/0133018 A1 | 7/2003 | Ziemkowski |
| 2003/0147252 A1 | 8/2003 | Fioravanti |
| 2003/0156077 A1 | 8/2003 | Balogh |
| 2004/0002179 A1 | 1/2004 | Barton et al. |
| 2004/0012688 A1 | 1/2004 | Tinnerinno et al. |
| 2004/0012689 A1 | 1/2004 | Tinnerinno et al. |
| 2004/0101166 A1 | 5/2004 | Williams et al. |
| 2004/0114176 A1 | 6/2004 | Bodin et al. |
| 2004/0135780 A1 | 7/2004 | Nims |
| 2004/0189686 A1 | 9/2004 | Tanguay et al. |
| 2004/0257360 A1 | 12/2004 | Sieckmann |
| 2005/0031203 A1 | 2/2005 | Fukuda |
| 2005/0049500 A1 | 3/2005 | Babu et al. |
| 2005/0052543 A1 | 3/2005 | Li et al. |
| 2005/0080602 A1 | 4/2005 | Snyder et al. |
| 2005/0162540 A1 | 7/2005 | Yata |
| 2005/0212918 A1 | 9/2005 | Serra et al. |
| 2005/0276441 A1 | 12/2005 | Debevec |
| 2006/0023066 A1 | 2/2006 | Li et al. |
| 2006/0050170 A1 | 3/2006 | Tanaka |
| 2006/0056040 A1 | 3/2006 | Lan |
| 2006/0056604 A1 | 3/2006 | Sylthe et al. |
| 2006/0072175 A1 | 4/2006 | Oshino |
| 2006/0082879 A1 | 4/2006 | Miyoshi et al. |
| 2006/0130017 A1 | 6/2006 | Cohen et al. |
| 2006/0208259 A1 | 9/2006 | Jeon |
| 2006/0248348 A1 | 11/2006 | Wakao et al. |
| 2006/0250322 A1 | 11/2006 | Hall et al. |
| 2006/0256226 A1 | 11/2006 | Alon et al. |
| 2006/0274210 A1 | 12/2006 | Kim |
| 2006/0285741 A1 | 12/2006 | Subbarao |
| 2007/0008317 A1 | 1/2007 | Lundstrom |
| 2007/0019883 A1 | 1/2007 | Wong et al. |
| 2007/0030357 A1 | 2/2007 | Levien et al. |
| 2007/0033588 A1 | 2/2007 | Landsman |
| 2007/0052810 A1 | 3/2007 | Monroe |
| 2007/0071316 A1 | 3/2007 | Kubo |
| 2007/0081081 A1 | 4/2007 | Cheng |
| 2007/0097206 A1 | 5/2007 | Houvener et al. |
| 2007/0103558 A1 | 5/2007 | Cai et al. |
| 2007/0113198 A1 | 5/2007 | Robertson et al. |
| 2007/0140676 A1 | 6/2007 | Nakahara |
| 2007/0188613 A1 | 8/2007 | Norbori et al. |
| 2007/0201853 A1 | 8/2007 | Petschnigg |
| 2007/0229653 A1 | 10/2007 | Matusik et al. |
| 2007/0230944 A1 | 10/2007 | Georgiev |
| 2007/0269108 A1 | 11/2007 | Steinberg et al. |
| 2007/0273795 A1* | 11/2007 | Jaynes ............... H04N 9/3147 348/745 |
| 2008/0007626 A1 | 1/2008 | Wernersson |
| 2008/0012988 A1 | 1/2008 | Baharav et al. |
| 2008/0018668 A1 | 1/2008 | Yamauchi |
| 2008/0031537 A1 | 2/2008 | Gutkowicz-Krusin et al. |
| 2008/0049113 A1 | 2/2008 | Hirai |
| 2008/0056569 A1 | 3/2008 | Williams et al. |
| 2008/0122940 A1 | 5/2008 | Mori |
| 2008/0129728 A1 | 6/2008 | Satoshi |
| 2008/0144952 A1 | 6/2008 | Chen et al. |
| 2008/0152215 A1 | 6/2008 | Rorie et al. |
| 2008/0168404 A1 | 7/2008 | Ording |
| 2008/0180792 A1 | 7/2008 | Georgiev |
| 2008/0187305 A1 | 8/2008 | Raskar et al. |
| 2008/0193026 A1 | 8/2008 | Horie et al. |
| 2008/0205871 A1 | 8/2008 | Utagawa |
| 2008/0226274 A1 | 9/2008 | Spielberg |
| 2008/0232680 A1 | 9/2008 | Berestov et al. |
| 2008/0253652 A1 | 10/2008 | Gupta et al. |
| 2008/0260291 A1 | 10/2008 | Alakarhu et al. |
| 2008/0266688 A1 | 10/2008 | Errando Smet et al. |
| 2008/0277566 A1 | 11/2008 | Utagawa |
| 2008/0309813 A1 | 12/2008 | Watanabe |
| 2008/0316301 A1 | 12/2008 | Givon |
| 2009/0027542 A1 | 1/2009 | Yamamoto |
| 2009/0041381 A1 | 2/2009 | Georgiev et al. |
| 2009/0041448 A1 | 2/2009 | Georgiev et al. |
| 2009/0070710 A1 | 3/2009 | Kagaya |
| 2009/0109280 A1 | 4/2009 | Gotsman |
| 2009/0128658 A1 | 5/2009 | Hayasaka et al. |
| 2009/0128669 A1 | 5/2009 | Ng et al. |
| 2009/0135258 A1 | 5/2009 | Nozaki |
| 2009/0140131 A1 | 6/2009 | Utagawa |
| 2009/0102956 A1 | 7/2009 | Georgiev |
| 2009/0185051 A1 | 7/2009 | Sano |
| 2009/0185801 A1 | 7/2009 | Georgiev et al. |
| 2009/0190022 A1 | 7/2009 | Ichimura |
| 2009/0190024 A1 | 7/2009 | Hayasaka et al. |
| 2009/0195689 A1 | 8/2009 | Hwang et al. |
| 2009/0202235 A1 | 8/2009 | Li et al. |
| 2009/0204813 A1 | 8/2009 | Kwan |
| 2009/0207233 A1 | 8/2009 | Mauchly et al. |
| 2009/0273843 A1 | 11/2009 | Raskar et al. |
| 2009/0295829 A1 | 12/2009 | Georgiev et al. |
| 2009/0309973 A1 | 12/2009 | Kogane |
| 2009/0309975 A1* | 12/2009 | Gordon ............... H04N 5/23206 348/159 |
| 2009/0310885 A1 | 12/2009 | Tamaru |

(56) References Cited

U.S. PATENT DOCUMENTS

| | | |
|---|---|---|
| 2009/0321861 A1 | 12/2009 | Oliver et al. |
| 2010/0003024 A1 | 1/2010 | Agrawal et al. |
| 2010/0021001 A1 | 1/2010 | Honsinger et al. |
| 2010/0026852 A1 | 2/2010 | Ng et al. |
| 2010/0050120 A1 | 2/2010 | Ohazama et al. |
| 2010/0060727 A1 | 3/2010 | Steinberg et al. |
| 2010/0097444 A1 | 4/2010 | Lablans |
| 2010/0103311 A1 | 4/2010 | Makii |
| 2010/0107068 A1 | 4/2010 | Butcher et al. |
| 2010/0111489 A1 | 5/2010 | Presler |
| 2010/0123784 A1 | 5/2010 | Ding et al. |
| 2010/0141780 A1 | 6/2010 | Tan et al. |
| 2010/0142839 A1 | 6/2010 | Lakus-Becker |
| 2010/0201789 A1 | 8/2010 | Yahagi |
| 2010/0253782 A1 | 10/2010 | Elazary |
| 2010/0265385 A1 | 10/2010 | Knight et al. |
| 2010/0277629 A1 | 11/2010 | Tanaka |
| 2010/0303288 A1 | 12/2010 | Malone |
| 2010/0328485 A1 | 12/2010 | Imamura et al. |
| 2011/0018903 A1 | 1/2011 | Lapstun et al. |
| 2011/0019056 A1 | 1/2011 | Hirsch et al. |
| 2011/0025827 A1 | 2/2011 | Shpunt et al. |
| 2011/0032338 A1 | 2/2011 | Raveendran et al. |
| 2011/0050864 A1 | 3/2011 | Bond |
| 2011/0050909 A1 | 3/2011 | Ellenby |
| 2011/0069175 A1 | 3/2011 | Mistretta et al. |
| 2011/0075729 A1 | 3/2011 | Dane et al. |
| 2011/0090255 A1 | 4/2011 | Wilson et al. |
| 2011/0123183 A1 | 5/2011 | Adelsberger et al. |
| 2011/0129120 A1 | 6/2011 | Chan |
| 2011/0129165 A1 | 6/2011 | Lim et al. |
| 2011/0148764 A1 | 6/2011 | Gao |
| 2011/0149074 A1 | 6/2011 | Lee et al. |
| 2011/0169994 A1 | 7/2011 | DiFrancesco et al. |
| 2011/0205384 A1 | 8/2011 | Zamowski et al. |
| 2011/0221947 A1 | 9/2011 | Awazu |
| 2011/0242334 A1 | 10/2011 | Wilburn et al. |
| 2011/0242352 A1 | 10/2011 | Hikosaka |
| 2011/0261164 A1 | 10/2011 | Olesen et al. |
| 2011/0261205 A1 | 10/2011 | Sun |
| 2011/0267263 A1 | 11/2011 | Hinckley |
| 2011/0273466 A1 | 11/2011 | Imai et al. |
| 2011/0279479 A1 | 11/2011 | Rodriguez |
| 2011/0133649 A1 | 12/2011 | Bales et al. |
| 2011/0292258 A1 | 12/2011 | Adler |
| 2011/0298960 A1 | 12/2011 | Tan et al. |
| 2011/0304745 A1 | 12/2011 | Wang et al. |
| 2011/0311046 A1 | 12/2011 | Oka |
| 2011/0316968 A1 | 12/2011 | Taguchi et al. |
| 2012/0014837 A1 | 1/2012 | Fehr et al. |
| 2012/0050562 A1 | 3/2012 | Perwass et al. |
| 2012/0056889 A1 | 3/2012 | Carter et al. |
| 2012/0057040 A1 | 3/2012 | Park et al. |
| 2012/0057806 A1 | 3/2012 | Backlund et al. |
| 2012/0062755 A1 | 3/2012 | Takahashi et al. |
| 2012/0132803 A1 | 5/2012 | Hirato et al. |
| 2012/0133746 A1 | 5/2012 | Bigioi et al. |
| 2012/0147205 A1 | 6/2012 | Lelescu et al. |
| 2012/0176481 A1 | 7/2012 | Lukk et al. |
| 2012/0188344 A1 | 7/2012 | Imai |
| 2012/0201475 A1 | 8/2012 | Carmel et al. |
| 2012/0206574 A1 | 8/2012 | Shikata et al. |
| 2012/0218463 A1 | 8/2012 | Benezra et al. |
| 2012/0224787 A1 | 9/2012 | Imai |
| 2012/0229691 A1 | 9/2012 | Hiasa et al. |
| 2012/0249529 A1 | 10/2012 | Matsumoto |
| 2012/0249550 A1 | 10/2012 | Akeley |
| 2012/0249819 A1 | 10/2012 | Imai |
| 2012/0251131 A1 | 10/2012 | Henderson et al. |
| 2012/0257065 A1 | 10/2012 | Velarde et al. |
| 2012/0257795 A1 | 10/2012 | Kim et al. |
| 2012/0272271 A1 | 10/2012 | Nishizawa et al. |
| 2012/0287246 A1 | 11/2012 | Katayama |
| 2012/0287296 A1 | 11/2012 | Fukui |
| 2012/0287329 A1 | 11/2012 | Yahata |
| 2012/0293075 A1 | 11/2012 | Engelen et al. |
| 2012/0300091 A1 | 11/2012 | Shroff et al. |
| 2012/0237222 A9 | 12/2012 | Ng et al. |
| 2013/0002902 A1 | 1/2013 | Ito |
| 2013/0002936 A1 | 1/2013 | Hirama et al. |
| 2013/0021486 A1 | 1/2013 | Richardson |
| 2013/0038696 A1 | 2/2013 | Ding et al. |
| 2013/0041215 A1 | 2/2013 | McDowall |
| 2013/0044290 A1 | 2/2013 | Kawamura |
| 2013/0050546 A1 | 2/2013 | Kano |
| 2013/0064453 A1 | 3/2013 | Nagasaka et al. |
| 2013/0064532 A1 | 3/2013 | Caldwell et al. |
| 2013/0070059 A1 | 3/2013 | Kushida |
| 2013/0070060 A1 | 3/2013 | Chatterjee et al. |
| 2013/0077880 A1 | 3/2013 | Venkataraman et al. |
| 2013/0082905 A1 | 4/2013 | Ranieri et al. |
| 2013/0088616 A1 | 4/2013 | Ingrassia, Jr. |
| 2013/0093844 A1 | 4/2013 | Shuto |
| 2013/0093859 A1 | 4/2013 | Nakamura |
| 2013/0094101 A1 | 4/2013 | Oguchi |
| 2013/0107085 A1 | 5/2013 | Ng et al. |
| 2013/0113981 A1 | 5/2013 | Knight et al. |
| 2013/0120356 A1 | 5/2013 | Georgiev et al. |
| 2013/0120605 A1 | 5/2013 | Georgiev et al. |
| 2013/0120636 A1 | 5/2013 | Baer |
| 2013/0127901 A1 | 5/2013 | Georgiev et al. |
| 2013/0128052 A1 | 5/2013 | Catrein et al. |
| 2013/0128081 A1 | 5/2013 | Georgiev et al. |
| 2013/0128087 A1 | 5/2013 | Georgiev et al. |
| 2013/0135448 A1 | 5/2013 | Nagumo et al. |
| 2013/0176481 A1 | 7/2013 | Holmes et al. |
| 2013/0188068 A1 | 7/2013 | Said |
| 2013/0215108 A1 | 8/2013 | McMahon et al. |
| 2013/0215226 A1 | 8/2013 | Chauvier et al. |
| 2013/0222656 A1 | 8/2013 | Kaneko |
| 2013/0234935 A1 | 9/2013 | Griffith |
| 2013/0242137 A1 | 9/2013 | Kirkland |
| 2013/0243391 A1 | 9/2013 | Park et al. |
| 2013/0258451 A1 | 10/2013 | El-Ghoroury et al. |
| 2013/0262511 A1 | 10/2013 | Kuffner et al. |
| 2013/0286236 A1 | 10/2013 | Mankowski |
| 2013/0321574 A1 | 12/2013 | Zhang et al. |
| 2013/0321581 A1 | 12/2013 | El-Ghoroury |
| 2013/0321677 A1 | 12/2013 | Cote et al. |
| 2013/0329107 A1 | 12/2013 | Burley et al. |
| 2013/0329132 A1 | 12/2013 | Tico et al. |
| 2013/0335596 A1 | 12/2013 | Demandoix et al. |
| 2013/0342700 A1 | 12/2013 | Kass |
| 2014/0002502 A1 | 1/2014 | Han |
| 2014/0002699 A1 | 1/2014 | Guan |
| 2014/0003719 A1 | 1/2014 | Bai et al. |
| 2014/0013273 A1 | 1/2014 | Ng |
| 2014/0035959 A1 | 2/2014 | Lapstun |
| 2014/0037280 A1 | 2/2014 | Shirakawa |
| 2014/0049663 A1 | 2/2014 | Ng et al. |
| 2014/0059462 A1 | 2/2014 | Wernersson |
| 2014/0085282 A1 | 3/2014 | Luebke et al. |
| 2014/0092424 A1 | 4/2014 | Grosz |
| 2014/0098191 A1 | 4/2014 | Rime et al. |
| 2014/0132741 A1 | 5/2014 | Aagaard et al. |
| 2014/0133749 A1 | 5/2014 | Kuo et al. |
| 2014/0139538 A1 | 5/2014 | Barber et al. |
| 2014/0167196 A1 | 6/2014 | Heimgartner et al. |
| 2014/0176540 A1 | 6/2014 | Tosio et al. |
| 2014/0176592 A1 | 6/2014 | Wilburn et al. |
| 2014/0176710 A1 | 6/2014 | Brady |
| 2014/0177905 A1 | 6/2014 | Grefalda |
| 2014/0184885 A1 | 7/2014 | Tanaka et al. |
| 2014/0192208 A1 | 7/2014 | Okincha |
| 2014/0193047 A1 | 7/2014 | Grosz |
| 2014/0195921 A1 | 7/2014 | Grosz |
| 2014/0204111 A1 | 7/2014 | Vaidyanathan et al. |
| 2014/0211077 A1 | 7/2014 | Ng et al. |
| 2014/0218540 A1 | 8/2014 | Geiss et al. |
| 2014/0226038 A1 | 8/2014 | Kimura |
| 2014/0240463 A1 | 8/2014 | Pitts et al. |
| 2014/0240578 A1 | 8/2014 | Fishman et al. |
| 2014/0245367 A1* | 8/2014 | Sasaki ............... H04N 21/4402 725/109 |

(56) References Cited

U.S. PATENT DOCUMENTS

| | | |
|---|---|---|
| 2014/0267243 A1 | 9/2014 | Venkataraman et al. |
| 2014/0267639 A1 | 9/2014 | Tatsuta |
| 2014/0300753 A1 | 10/2014 | Yin |
| 2014/0313350 A1 | 10/2014 | Keelan |
| 2014/0313375 A1 | 10/2014 | Milnar |
| 2014/0333787 A1* | 11/2014 | Venkataraman ............ H01L 27/14618 348/218.1 |
| 2014/0340390 A1 | 11/2014 | Lanman et al. |
| 2014/0347540 A1 | 11/2014 | Kang |
| 2014/0354863 A1 | 12/2014 | Ahn et al. |
| 2014/0368494 A1 | 12/2014 | Sakharnykh et al. |
| 2014/0368640 A1 | 12/2014 | Strandemar et al. |
| 2015/0062178 A1 | 3/2015 | Matas et al. |
| 2015/0062386 A1 | 3/2015 | Sugawara |
| 2015/0092071 A1 | 4/2015 | Meng et al. |
| 2015/0097985 A1 | 4/2015 | Akeley |
| 2015/0193937 A1 | 7/2015 | Georgiev et al. |
| 2015/0206340 A1 | 7/2015 | Munkberg et al. |
| 2015/0207990 A1 | 7/2015 | Ford et al. |
| 2015/0237273 A1 | 8/2015 | Sawadaishi |
| 2015/0104101 A1 | 10/2015 | Bryant et al. |
| 2015/0310592 A1 | 10/2015 | Kano |
| 2015/0312553 A1 | 10/2015 | Ng et al. |
| 2015/0312593 A1 | 10/2015 | Akeley et al. |
| 2015/0346832 A1 | 12/2015 | Cole et al. |
| 2015/0370011 A1 | 12/2015 | Ishihara |
| 2015/0370012 A1 | 12/2015 | Ishihara |
| 2015/0373279 A1* | 12/2015 | Osborne ............ G02B 13/0075 348/36 |
| 2016/0029017 A1 | 1/2016 | Liang |
| 2016/0065931 A1 | 3/2016 | Konieczny |
| 2016/0065947 A1 | 3/2016 | Cole et al. |
| 2016/0142615 A1 | 5/2016 | Liang |
| 2016/0155215 A1 | 6/2016 | Suzuki |
| 2016/0165206 A1 | 6/2016 | Huang et al. |
| 2016/0173844 A1 | 6/2016 | Knight |
| 2016/0191823 A1 | 6/2016 | El-Ghoroury |
| 2016/0253837 A1 | 9/2016 | Zhu et al. |
| 2016/0269620 A1 | 9/2016 | Romanenko et al. |
| 2016/0307368 A1 | 10/2016 | Akeley |
| 2016/0307372 A1 | 10/2016 | Pitts et al. |
| 2016/0309065 A1 | 10/2016 | Karafin et al. |
| 2016/0353026 A1 | 12/2016 | Blonde et al. |
| 2016/0381348 A1 | 12/2016 | Hayasaka |
| 2017/0059305 A1 | 3/2017 | Nonn et al. |
| 2017/0067832 A1 | 3/2017 | Ferrara, Jr. et al. |
| 2017/0094906 A1 | 3/2017 | Liang et al. |
| 2017/0134639 A1 | 5/2017 | Pitts et al. |
| 2017/0139131 A1 | 5/2017 | Karafin et al. |
| 2017/0221226 A1* | 8/2017 | Shen .................. G06T 7/80 |
| 2017/0237971 A1 | 8/2017 | Pitts |
| 2017/0243373 A1 | 8/2017 | Bevensee et al. |
| 2017/0244948 A1 | 8/2017 | Pang et al. |
| 2017/0256036 A1 | 9/2017 | Song et al. |
| 2017/0263012 A1 | 9/2017 | Sabater et al. |
| 2017/0302903 A1 | 10/2017 | Ng et al. |
| 2017/0358092 A1 | 12/2017 | Bleibel et al. |
| 2017/0365068 A1 | 12/2017 | Tan et al. |
| 2017/0374411 A1 | 12/2017 | Lederer et al. |
| 2018/0012397 A1 | 1/2018 | Carothers |
| 2018/0020204 A1 | 1/2018 | Pang et al. |
| 2018/0024753 A1 | 1/2018 | Gewickey et al. |
| 2018/0033209 A1 | 2/2018 | Akeley et al. |
| 2018/0034134 A1 | 2/2018 | Pang et al. |
| 2018/0070066 A1 | 3/2018 | Knight |
| 2018/0070067 A1 | 3/2018 | Knight |
| 2018/0082405 A1 | 3/2018 | Liang |
| 2018/0089903 A1 | 3/2018 | Pang et al. |
| 2018/0097867 A1 | 4/2018 | Pang et al. |
| 2018/0158198 A1 | 6/2018 | Kamad |

FOREIGN PATENT DOCUMENTS

| | | |
|---|---|---|
| DE | 19624421 | 1/1997 |
| JP | 2010020100 | 1/2010 |
| JP | 2011135170 | 7/2011 |
| WO | 2003052465 | 6/2003 |
| WO | 2006039486 | 4/2006 |
| WO | 2007092545 | 8/2007 |
| WO | 2007092581 | 8/2007 |
| WO | 2011010234 | 3/2011 |
| WO | 2011029209 | 3/2011 |
| WO | 2011081187 | 7/2011 |

OTHER PUBLICATIONS

VR Playhouse, "The Surrogate," http://www.vrplayhouse.com/the-surrogate.

Wikipedia—Autofocus systems and methods: hllp://en.wikipedia.orgiwiki/Autofocus. Retrieved Jan. 2013.

Wikipedia—Compression standard JPEG XR: http://en.wikipedia.orgiwiki/JPEG_XR. Retrieved Jan. 2013.

Nimeroff, J., et al., "Efficient rendering of naturally illuminatied environments" in Fifth Eurographics Workshop on Rendering, 359-373, 1994.

Nokia, "City Lens", May 2012.

Ogden, J., "Pyramid-Based Computer Graphics", 1985.

Okano et al., "Three-dimensional video system based on integral photography" Optical Engineering, Jun. 1999. vol. 38, No. 6, pp. 1072-1077.

Orzan, Alexandrina, et al., "Diffusion Curves: A Vector Representation for Smooth-Shaded Images," ACM Transactions on Graphics—Proceedings of SIGGRAPH 2008; vol. 27; 2008.

Pain, B., "Back-Side Illumination Technology for SOI-CMOS Image Sensors", 2009.

Perez, Patrick et al., "Poisson Image Editing," ACM Transactions on Graphics—Proceedings of ACM Siggraph 2003; vol. 22, Issue 3; Jul. 2003; pp. 313-318.

Petschnigg, George, et al., "Digial Photography with Flash and No-Flash Image Pairs", SIGGRAPH 2004.

Primesense, "The Primesense 3D Awareness Sensor", 2007.

Ramamoorthi, R., et al, "Frequency space environment map rendering" ACM Transactions on Graphics (SIGGRAPH 2002 proceedings) 21, 3, 517-526.

Ramamoorthi, R., et al., "An efficient representation for irradiance environment maps", in Proceedings of SIGGRAPH 2001, 497-500.

Raskar, Ramesh et al., "Glare Aware Photography: 4D Ray Sampling for Reducing Glare Effects of Camera Lenses," ACM Transactions on Graphics—Proceedings of ACM SIGGRAPH, Aug. 2008; vol. 27, Issue 3; pp. 1-10.

Raskar, Ramesh et al., "Non-photorealistic Camera: Depth Edge Detection and Stylized Rendering using Multi-Flash Imaging", SIGGRAPH 2004.

Raytrix, "Raytrix Lightfield Camera," Raytrix GmbH, Germany 2012, pp. 1-35.

Roper Scientific, Germany "Fiber Optics," 2012.

Scharstein, Daniel, et al., "High-Accuracy Stereo Depth Maps Using Structured Light," CVPR'03 Proceedings of the 2003 IEEE Computer Society, pp. 195-202.

Schirmacher, H. et al., "High-Quality Interactive Lumigraph Rendering Through Warping," May 2000, Graphics Interface 2000.

Shade, Jonathan, et al., "Layered Depth Images", SIGGRAPH 98, pp. 1-2. 1998.

Shreiner, OpenGL Programming Guide, 7th edition, Chapter 8, 2010.

Simpleviewer, "Tiltview", http://simpleviewer.net/tiltviewer. Retrieved Jan. 2013.

Skodras, A. et al., "The JPEG 2000 Still Image Compression Standard," Sep. 2001, IEEE Signal Processing Magazine, pp. 36-58.

Sloan, P., et al., "Precomputed radiance transfer for real-time rendering in dynamic, low-frequency lighting environments", ACM Transactions on Graphics 21, 3, 527-536, 2002.

(56) References Cited

OTHER PUBLICATIONS

Snavely, Noah, et al., "Photo-tourism: Exploring Photo collections in 3D", ACM Transactions on Graphics (SIGGRAPH Proceedings), 2006.
Sokolov, "Autostereoscopy and Integral Photography by Professor Lippmann's Method" , 1911, pp. 23-29.
Sony Corp, "Interchangeable Lens Digital Camera Handbook", 2011.
Sony, Sony's First Curved Sensor Photo: http://www.engadget.com; Jul. 2014.
Stensvold, M., "Hybrid AF: A New Approach to Autofocus Is Emerging for both Still and Video", Digital Photo Magazine, Nov. 13, 2012.
Story, D., "The Future of Photography", Optics Electronics, Oct. 2008.
Sun, Jian, et al., "Stereo Matching Using Belief Propagation", 2002.
Tagging photos on Flickr, Facebook and other online photo sharing sites (see, for example, http://support.gnip.com/customer/portal/articles/809309-flickr-geo-photos-tag-search). Retrieved Jan. 2013.
Takahashi, Keita, et al., "All in-focus View Synthesis from Under-Sampled Light Fields", ICAT 2003, Tokyo, Japan.
Tanida et al., "Thin observation module by bound optics (TOMBO): concept and experimental verification" Applied Optics 40, 11 (Apr. 10, 2001), pp. 1806-1813.
Tao, Michael, et al., "Depth from Combining Defocus and Correspondence Using Light-Field Cameras", Dec. 2013.
Techcrunch, "Coolinis", Retrieved Jan. 2013.
Teo, P., et al., "Efficient linear rendering for interactive light design", Tech. Rep. STAN-CS-TN-97-60, 1998, Stanford University.
Teranishi, N. "Evolution of Optical Structure in Images Sensors," Electron Devices Meeting (IEDM) 2012 IEEE International; Dec. 10-13, 2012.
Vaish et al., "Using plane + parallax for calibrating dense camera arrays", In Proceedings CVPR 2004, pp. 2-9.
Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.
VR Playhouse, "The Surrogate," http://www.vrplayhouse.com/the-surrogate 2016.
Wanner, S. et al., "Globally Consistent Depth Labeling of 4D Light Fields," IEEE Conference on Computer Vision and Pattern Recognition, 2012.
Wanner, S. et al., "Variational Light Field Analysis for Disparity Estimation and Super-Resolution," IEEE Transacations on Pattern Analysis and Machine Intellegence, 2013.
Wenger, et al, "Performance Relighting and Reflectance Transformation with Time-Multiplexed Illumination", Institute for Creative Technologies, SIGGRAPH 2005.
Wetzstein, Gordon, et al., "Sensor Saturation in Fourier Multiplexed Imaging", IEEE Conference on Computer Vision and Pattern Recognition (2010).
Wikipedia—Adaptive Optics: http://en.wikipedia.org/wiki/adaptive_optics. Retrieved Feb. 2014.
Wikipedia—Autofocus systems and methods: http://en.wikipedia.org/wiki/Autofocus. Retrieved Jan. 2013.
Wikipedia—Bayer Filter: http:/en.wikipedia.org/wiki/Bayer_filter. Retrieved Jun. 20, 2013.
Wikipedia—Color Image Pipeline: http://en.wikipedia.org/wiki/color_image_pipeline. Retrieved Jan. 15, 2014.
Wikipedia—Compression standard JPEG XR: http://en.wikipedia.org/wiki/JPEG_XR. Retrieved Jan. 2013.
Wikipedia—CYGM Filter: http://en.wikipedia.org/wiki/CYGM_filter. Retrieved Jun. 20, 2013.
Georgiev, T., et al., "Suppersolution with Plenoptic 2.0 Cameras," Optical Society of America 2009; pp. 1-3.
Georgiev, T., et al., "Unified Frequency Domain Analysis of Lightfield Cameras" (2008).
Georgiev, T., et al., Plenoptic Camera 2.0 (2008).
Girod, B., "Mobile Visual Search", IEEE Signal Processing Magazine, Jul. 2011.
Gortler et al., "The lumigraph" SIGGRAPH 96, pp. 43-54. 1996.
Groen et al., "A Comparison of Different Focus Functions for Use in Autofocus Algorithms," Cytometry 6:81-91, 1985.
Haeberli, Paul "A Multifocus Method for Controlling Depth of Field" GRAPHICA Obscura, 1994, pp. 1-3.
Heide, F. et al., "High-Quality Computational Imaging Through Simple Lenses," ACM Transactions on Graphics, SIGGRAPH 2013; pp. 1-7.
Heidelberg Collaboratory for Image Processing, "Consistent Depth Estimation in a 4D Light Field," May 2013.
Hirigoyen, F., et al., "1.1 um Backside Imager vs. Frontside Image: an optics-dedicated FDTD approach", IEEE 2009 International Image Sensor Workshop.
Huang, Fu-Chung et al., "Eyeglasses-free Display: Towards Correcting Visual Aberrations with Computational Light Field Displays," ACM Transaction on Graphics, Aug. 2014, pp. 1-12.
Isaksen, A., et al., "Dynamically Reparameterized Light Fields," SIGGRAPH 2000, pp. 297-306.
Ives H., "Optical properties of a Lippman lenticulated sheet," J. Opt. Soc. Am. 21, 171 (1931).
Ives, H. "Parallax Panoramagrams Made with a Large Diameter Lens", Journal of the Optical Society of America; 1930.
Jackson et al., "Selection of a Convolution Function for Fourier Inversion Using Gridding" IEEE Transactions on Medical Imaging, Sep. 1991, vol. 10, No. 3, pp. 473-478.
Kautz, J., et al., "Fast arbitrary BRDF shading for low-frequency lighting using spherical harmonics", in Eurographic Rendering Workshop 2002, 291-296.
Koltun, et al., "Virtual Occluders: An Efficient Interediate PVS Representation", Rendering Techniques 2000: Proc. 11th Eurographics Workshop Rendering, pp. 59-70, Jun. 2000.
Kopf, J., et al., Deep Photo: Model-Based Photograph Enhancement and Viewing, SIGGRAPH Asia 2008.
Lehtinen, J., et al. "Matrix radiance transfer", in Symposium on Interactive 3D Graphics, 59-64, 2003.
Lesser, Michael, "Back-Side Illumination", 2009.
Levin, A., et al., "Image and Depth from a Conventional Camera with a Coded Aperture", SIGGRAPH 2007, pp. 1-9.
Levoy et al.,"Light Field Rendering" SIGGRAPH 96 Proceeding, 1996. pp. 31-42.
Levoy, "Light Fields and Computational Imaging" IEEE Computer Society, Aug. 2006, pp. 46-55.
Levoy, M. "Light Field Photography and Videography," Oct. 18, 2005.
Levoy, M. "Stanford Light Field Microscope Project," 2008; http://graphics.stanford.edu/projects/lfmicroscope/, 4 pages.
Levoy, M., "Autofocus: Contrast Detection", http://graphics.stanford.edu/courses/cs178/applets/autofocusPD.html, pp. 1-3, 2010.
Levoy, M., "Autofocus: Phase Detection", http://graphics.stanford.edu/courses/cs178/applets/autofocusPD.html, pp. 1-3, 2010.
Levoy, M., et al., "Light Field Microscopy," ACM Transactions on Graphics, vol. 25, No. 3, Proceedings SIGGRAPH 2006.
Liang, Chia-Kai, et al., "Programmable Aperture Photography: Multiplexed Light Field Acquisition", ACM SIGGRAPH, 2008.
Lippmann, "Reversible Prints", Communication at the French Society of Physics, Journal of Physics, 7 , Mar. 4, 1908, pp. 821-825.
Lumsdaine et al., "Full Resolution Lighffield Rendering" Adobe Technical Report Jan. 2008, pp. 1-12.
Maeda, Y. et al., "A CMOS Image Sensor with Pseudorandom Pixel Placement for Clear Imaging," 2009 International Symposium on Intelligent Signal Processing and Communication Systems, Dec. 2009.
Magnor, M. et al., "Model-Aided Coding of Multi-Viewpoint Image Data," Proceedings IEEE Conference on Image Processing, ICIP-2000, Vancouver, Canada, Sep. 2000. https://graphics.tu-bs.de/static/people/magnor/publications/icip00.pdf.
Mallat, Stephane, "A Wavelet Tour of Signal Processing", Academic Press 1998.
Malzbender, et al., "Polynomial Texture Maps", Proceedings SIGGRAPH 2001.

(56) References Cited

OTHER PUBLICATIONS

Marshall, Richard J. et al., "Improving Depth Estimation from a Plenoptic Camera by Patterned Illumination," Proc. Of SPIE, vol. 9528, 2015, pp. 1-6.
Masselus, Vincent, et al., "Relighting with 4D Incident Light Fields", SIGGRAPH 2003.
Meynants, G., et al., "Pixel Binning in CMOS Image Sensors," Frontiers in Electronic Imaging Conference, 2009.
Moreno-Noguer, F. et al., "Active Refocusing of Images and Videos," ACM Transactions on Graphics, Aug. 2007; pp. 1-9.
Munkberg, J. et al., "Layered Reconstruction for Defocus and Motion Blur" EGSR 2014, pp. 1-12.
Naemura et al., "3-D Computer Graphics based on Integral Photography" Optics Express, Feb. 12, 2001. vol. 8, No. 2, pp. 255-262.
Nakamura, J., "Image Sensors and Signal Processing for Digital Still Cameras" (Optical Science and Engineering), 2005.
National Instruments, "Anatomy of a Camera," pp. 1-5, Sep. 6, 2006.
Nayar, Shree, et al., "Shape from Focus", IEEE Transactions on Pattern Analysis and Machine Intelligence, vol. 16, No. 8, pp. 824-831, Aug. 1994.
Ng, R., et al. "Light Field Photography with a Hand-held Plenoptic Camera," Stanford Technical Report, CSTR 2005-2, 2005.
Ng, R., et al., "All-Frequency Shadows Using Non-linear Wavelet Lighting Approximation. ACM Transactions on Graphics," ACM Transactions on Graphics; Proceedings of SIGGRAPH 2003.
Ng, R., et al., "Triple Product Wavelet Integrals for All-Frequency Relighting", ACM Transactions on Graphics :Proceedings of SIGGRAPH 2004).
Ng, Yi-Ren, "Digital Light Field Photography," Doctoral Thesis, Standford University, Jun. 2006; 203 pages.
Ng., R., "Fourier Slice Photography," ACM Transactions on Graphics, Proceedings of SIGGRAPH 2005, vol. 24, No. 3, 2005, pp. 735-744.
Nguyen, Hubert. "Practical Post-Process. Depth of Field." GPU Gems 3. Upper Saddle River, NJ: Addison-Wesley, 2008.
U.S. Appl. No. 15/967,076, filed Apr. 30, 2018 listing Jiantao Kuang et al. as inventors, entitled "Automatic Lens Flare Detection and Correction for Light-Field Images".
U.S. Appl. No. 15/666,298, filed Aug. 1, 2017 listing Yonggang Ha et al. as inventors, entitled "Focal Reducer with Controlled Optical Properties for Interchangeable Lens Light-Field Camera".
U.S. Appl. No. 15/590,808, filed May 9, 2017 listing Alex Song et al. as inventors, entitled "Adaptive Control for Immersive Experience Delivery".
U.S. Appl. No. 15/864,938, filed Jan. 8, 2018 listing Jon Karafin et al. as inventors, entitled "Motion Blur for Light-Field Images".
U.S. Appl. No. 15/703,553, filed Sep. 13, 2017 listing Jon Karafin et al. as inventors, entitled "4D Camera Tracking and Optical Stabilization".
U.S. Appl. No. 15/590,841, filed May 9, 2017 listing Kurt Akeley et al, as inventors, entitled "Vantage Generation and Interactive Playback".
U.S. Appl. No. 15/944,551, filed Apr. 3, 2018 listing Zejing Wang et al. as inventors, entitled "Generating Jolly Zoom Effect Using Light Field Image Data".
U.S. Appl. No. 15/874,723, filed Jan. 18, 2018 listing Mark Weir et al. as inventors, entitled "Multi-Camera Navigation Interface".
U.S. Appl. No. 15/897,994, filed Feb. 15, 2018 listing Trevor Carothers et al. as inventors, entitled "Generation of Virtual Reality With 6 Degrees of Freesom from Limited Viewer Data".
U.S. Appl. No. 15/605,037, filed May 25, 2017 listing Zejing Wang et al. as inventors, entitled "Multi-View Back-Projection to a Light-Field".
U.S. Appl. No. 15/897,836, filed Feb. 15, 2018 listing Francois Bleibel et al. as inventors, entitled "Multiview Contour Tracking".
U.S. Appl. No. 15/897,042, filed Feb. 15, 2018 listing Francois Bleibel et al. as inventors, entitled "Multi-View Contour Tracking with Grabcut".

Adelsberger, R. et al., "Spatially Adaptive Photographic Flash," ETH Zurich, Department of Computer Science, Technical Report 612, 2008, pp. 1-12.
Adelson et al., "Single Lens Stereo with a Plenoptic Camera" IEEE Translation on Pattern Analysis and Machine Intelligence, Feb. 1992. vol. 14, No. 2, pp. 99-106.
Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.
Adobe Systems Inc, "XMP Specification", Sep. 2005.
Adobe, "Photoshop CS6 / in depth: Digital Negative (DNG)", http://www.adobe.com/products/photoshop/extend.displayTab2html. Retrieved Jan. 2013.
Agarwala, A., et al., "Interactive Digital Photomontage," ACM Transactions on Graphics, Proceedings of SIGGRAPH 2004, vol. 32, No. 3, 2004.
Andreas Observatory, Spectrograph Manual: IV. Flat-Field Correction, Jul. 2006.
Apple, "Apple iPad: Photo Features on the iPad", Retrieved Jan. 2013.
Bae, S., et al., "Defocus Magnification", Computer Graphics Forum, vol. 26, Issue 3 (Proc. Of Eurographics 2007), pp. 1-9.
Belhumeur, Peter et al., "The Bas-Relief Ambiguity", International Journal of Computer Vision, 1997, pp. 1060-1066.
Belhumeur, Peter, et al., "The Bas-Relief Ambiguity", International Journal of Computer Vision, 1999, pp. 33-44, revised version.
Bhat, P. et al. "GradientShop: A Gradient-Domain Optimization Framework for Image and Video Filtering," SIGGRAPH 2010; 14 pages.
Bolles, R., et al., "Epipolar-Plane Image Analysis: An Approach to Determining Structure from Motion", International Journal of Computer Vision, 1, 7-55 (1987).
Bourke, Paul, "Image filtering in the Frequency Domain," pp. 1-9, Jun. 1998.
Canon, Canon Speedlite wireless flash system, User manual for Model 550EX, Sep. 1998.
Chai, Jin-Xang et al., "Plenoptic Sampling", ACM SIGGRAPH 2000, Annual Conference Series, 2000, pp. 307-318.
Chen, S. et al., "A CMOS Image Sensor with On-Chip Image Compression Based on Predictive Boundary Adaptation and Memoryless QTD Algorithm," Very Large Scalee Integration (VLSI) Systems, IEEE Transactions, vol. 19, Issue 4; Apr. 2011.
Chen, W., et al., "Light Field mapping: Efficient representation and hardware rendering of surface light fields", ACM Transactions on Graphics 21, 3, 447-456, 2002.
Cohen, Noy et al., "Enhancing the performance of the light field microscope using wavefront coding," Optics Express, vol. 22, issue 20; 2014.
Daly, D., "Microlens Arrays" Retrieved Jan. 2013.
Debevec, et al, "A Lighting Reproduction Approach to Live-Action Compoisting" Proceedings SIGGRAPH 2002.
Debevec, P., et al., "Acquiring the reflectance field of a human face", SIGGRAPH 2000.
Debevec, P., et al., "Recovering high dynamic radiance maps from photographs", SIGGRAPH 1997, 369-378.
Design of the xBox menu. Retrieved Jan. 2013.
Digital Photography Review, "Sony Announce new RGBE CCD," Jul. 2003.
Dorsey, J., et al., "Design and simulation of opera light and projection effects", in Computer Graphics (Proceedings of SIGGRAPH 91), vol. 25, 41-50. 1991.
Dorsey, J., et al., "Interactive design of complex time dependent lighting", IEEE Computer Graphics and Applications 15, 2 (Mar. 1995), 26-36.
Dowski et al., "Wavefront coding: a modern method of achieving high performance and/or low cost imaging systems" SPIE Proceedings, vol. 3779, Jul. 1999, pp. 137-145.
Dowski, Jr. "Extended Depth of Field Through Wave-Front Coding," Applied Optics, vol. 34, No. 11, Apr. 10, 1995; pp. 1859-1866.
Duparre, J. et al., "Micro-Optical Artificial Compound Eyes," Institute of Physics Publishing, Apr. 2006.

(56) References Cited

OTHER PUBLICATIONS

Eisemann, Elmar, et al., "Flash Photography Enhancement via Intrinsic Relighting", SIGGRAPH 2004.
Fattal, Raanan, et al., "Multiscale Shape and Detail Enhancement from Multi-light Image Collections", SIGGRAPH 2007.
Fernando, Randima, "Depth of Field—A Survey of Techniques," GPU Gems. Boston, MA; Addison-Wesley, 2004.
Fitzpatrick, Brad, "Camlistore", Feb. 1, 2011.
Fujifilm, Super CCD EXR Sensor by Fujifilm, brochure reference No. EB-807E, 2008.
Georgiev, T. et al., "Reducing Plenoptic Camera Artifacts," Computer Graphics Forum, vol. 29, No. 6, pp. 1955-1968; 2010.
Georgiev, T., et al., "Spatio-Angular Resolution Tradeoff in Integral Photography," Proceedings of Eurographics Symposium on Rendering, 2006.
Wikipedia—Data overlay techniques for real-time visual feed. For example, heads-up displays: http://en.wikipedia.org/wiki/Head-up_display. Retrieved Jan. 2013.
Wikipedia—Exchangeable image file format: http://en.wikipedia.org/wiki/Exchangeable_image_file_format. Retrieved Jan. 2013.
Wikipedia—Expeed: http://en.wikipedia.org/wiki/Expeed. Retrieved Jan. 15, 2014.
Wikipedia—Extensible Metadata Platform: http://en.wikipedia.org/wiki/Extensible_Metadata_Plafform. Retrieved Jan. 2013.
Wikipedia—Key framing for video animation: http://en.wikipedia.org/wiki/Key_frame. Retrieved Jan. 2013.
Wikipedia—Lazy loading of image data: http://en.wikipedia.org/wiki/Lazy_loading. Retrieved Jan. 2013.
Wikipedia—Methods of Variable Bitrate Encoding: http://en.wikipedia.org/wiki/Variable_bitrate#Methods_of VBR_encoding. Retrieved Jan. 2013.
Wikipedia—Portable Network Graphics format: http://en.wikipedia.org/wiki/Portable_Network_Graphics. Retrieved Jan. 2013.
Wikipedia—Unsharp Mask Technique: https://en.wikipedia.org/wiki/Unsharp_masking. Retrieved May 3, 2016.
Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.
Wilburn, Bennett, et al., "High Speed Video Using a Dense Camera Array", 2004.
Wilburn, Bennett, et al., "The Light Field Video Camera", Proceedings of Media Processors 2002.
Williams, L. "Pyramidal Parametrics," Computer Graphic (1983).
Winnemoller, H., et al., "Light Waving: Estimating Light Positions From Photographs Alone", Eurographics 2005.
Wippermann, F. "Chirped Refractive Microlens Array," Dissertation 2007.
Wuu, S., et al., "A Manufacturable Back-Side Illumination Technology Using Bulk Si Substrate for Advanced CMOS Image Sensors", 2009 International Image Sensor Workshop, Bergen, Norway.
Wuu, S., et al., "BSI Technology with Bulk Si Wafer", 2009 International Image Sensor Workshop, Bergen, Norway.
Xiao, Z. et al., "Aliasing Detection and Reduction in Plenoptic Imaging," IEEE Conference on Computer Vision and Pattern Recognition; 2014.
Xu, Xin et al., "Robust Automatic Focus Algorithm for Low Contrast Images Using a New Contrast Measure," Sensors 2011; 14 pages.
Zheng, C. et al., "Parallax Photography: Creating 3D Cinematic Effects from Stills", Proceedings of Graphic Interface, 2009.
Zitnick, L. et al., "High-Quality Video View Interpolation Using a Layered Representation," Aug. 2004; ACM Transactions on Graphics (TOG), Proceedings of ACM SIGGRAPH 2004; vol. 23, Issue 3; pp. 600-608.
Zoberbier, M., et al., "Wafer Cameras—Novel Fabrication and Packaging Technologies", 2009 International Image Senor Workshop, Bergen, Norway, 5 pages.

\* cited by examiner

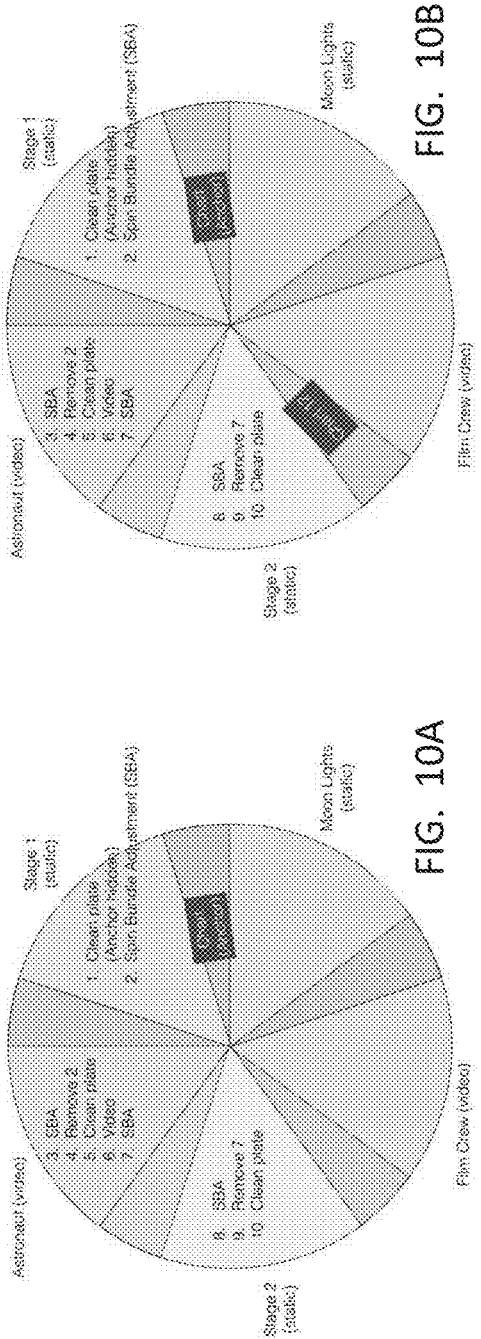
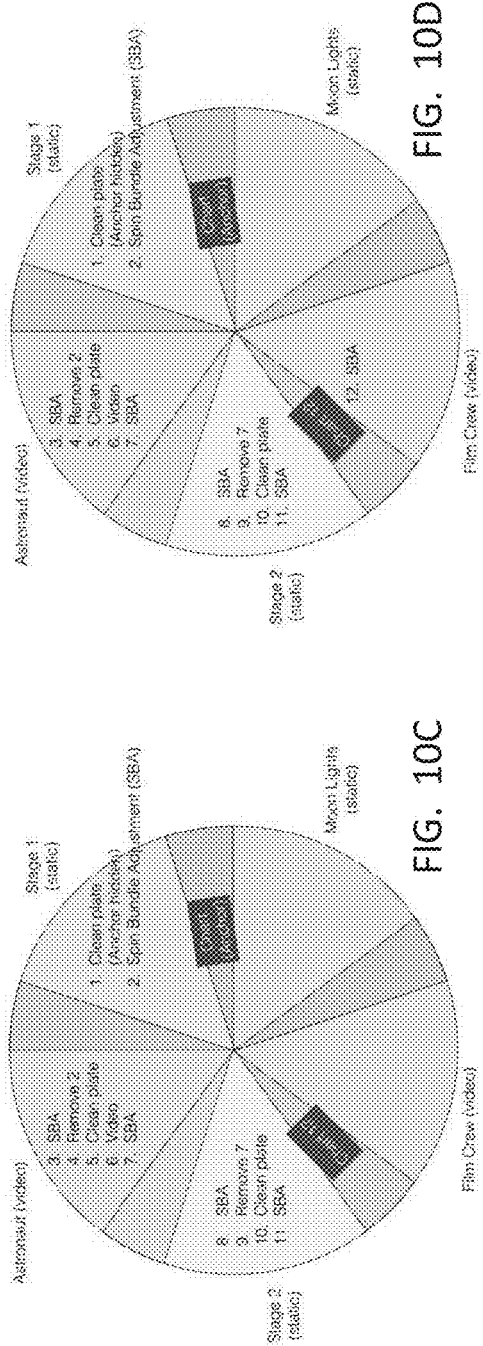
FIG. 10A
FIG. 10B
FIG. 10C
FIG. 10D

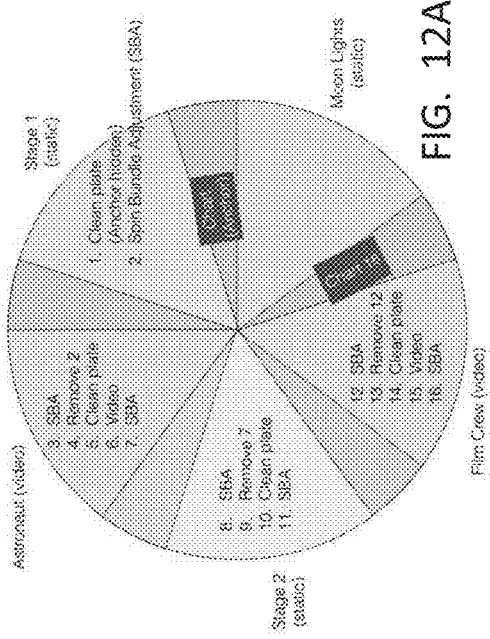

WEDGE-BASED LIGHT-FIELD VIDEO CAPTURE

CROSS-REFERENCE TO RELATED APPLICATIONS

The present application claims the benefit of U.S. Provisional Application Ser. No. 62/333,637 for "Image Capture for Virtual Reality Displays,", filed May 9, 2016, the disclosure of which is incorporated herein by reference in its entirety.

The present application also claims the benefit of U.S. Provisional Application Ser. No. 62/359,022 for "Combining Light-Field Data with Active Depth Data for Depth Map Generation,", filed Jul. 6, 2016, the disclosure of which is incorporated herein by reference in its entirety.

The present application also claims priority as a continuation-in-part of U.S. Utility application Ser. No. 15/582,237 for "Image Capture for Virtual Reality Displays,", filed Apr. 28, 2017, the disclosure of which is incorporated herein by reference in its entirety.

U.S. Utility application Ser. No. 15/582,237 claims the benefit of U.S. Provisional Application Ser. No. 62/333,637 for "Image Capture for Virtual Reality Displays", filed May 9, 2016, the disclosure of which is incorporated herein by reference in its entirety.

U.S. Utility application Ser. No. 15/582,237 also claims priority as a continuation-in-part of U.S. patent application Ser. No. 15/084,326 for "Capturing Light-Field Volume Images and Video Data Using Tiled Light-Field Cameras", filed Mar. 29, 2016, the disclosure of which is incorporate herein by reference in its entirety.

U.S. patent application Ser. No. 15/084,326 claims the benefit of U.S. Provisional Application Ser. No. 62/148,055 for "Light Guided Image Plane Tiled Arrays with Dense Fiber Optic Bundles for Light-Field and High Resolution Image Acquisition", filed Apr. 15, 2015, the disclosure of which is incorporated herein by reference in its entirety.

U.S. patent application Ser. No. 15/084,326 also claims the benefit of U.S. Provisional Application Ser. No. 62/148,460 for "Capturing Light-Field Volume Image and Video Data Using Tiled Light-Field Cameras", filed Apr. 16, 2015, the disclosure of which is incorporated herein by reference in its entirety.

The present application is related to U.S. application Ser. No. 15/590,808 for "Adaptive Control for Immersive Experience Delivery,", filed on the same date as the present application, the disclosure of which is incorporated herein by reference in its entirety.

The present application is also related to U.S. application Ser. No. 15/590,841 for "Vantage Generation and Interactive Playback,", filed on the same date as the present application, the disclosure of which is incorporated herein by reference in its entirety.

The present application is also related to U.S. application Ser. No. 15/590,877 for "Spatial Random Access Enabled Video System with a Three-Dimensional Viewing Volume,", filed on the same date as the present application, the disclosure of which is incorporated herein by reference in its entirety.

TECHNICAL FIELD

The present document relates to the use of a camera system such as a camera array to capture video in segments for applications such as virtual reality and augmented reality.

BACKGROUND

As better and more immersive display devices are created for providing virtual reality (VR) and augmented reality (AR) environments, it is desirable to be able to capture high quality imagery and video for these systems. In a stereo VR environment, a user sees separate views for each eye; also, the user may turn and move his or her head while viewing. As a result, it is desirable that the user receive high-resolution stereo imagery that is consistent and correct for any viewing position and orientation in the volume within which a user may move his or her head.

The most immersive virtual reality and augmented reality experiences have six degrees of freedom and view-dependent lighting. Accordingly, it is desirable to capture video of a scene with a full 360° view of the scene. Unfortunately, with known filming techniques, it is difficult to capture 360° video because it is difficult to hide the lighting, stage equipment, director, and other equipment and/or personnel needed to capture video.

SUMMARY

Various embodiments of the described system and method capture 360° video in sectors or "wedges," by rotating a camera system and capturing each wedge in sequence. In some embodiments, five wedges may be used to obtain full 90°/360° video or even 180°/360° video with a camera system having a 90° field-of-view. The camera system may be rotated to a new orientation to capture video for each wedge. In some embodiments, the camera system may be a camera array having a plurality of cameras arranged in a regular arrangement. For example, a hexagonal array may be used. Each of the cameras may be a light-field camera or a conventional camera. Video from an array of conventional cameras may be combined to generate light-field data.

The wedges may overlap slightly to facilitate the process of stitching the videos for each wedge together into a combined video. The video may be combined in such a manner that the resulting combined video is substantially without duplicative inclusion of the overlapping video portion(s). Depth information for the scene may also be captured to facilitate this process and/or to facilitate the process of adding one or more computer-generated elements to the wedge videos and/or the combined video.

It may be desirable to designate a safe action zone within one or more of the wedges, within which motion will only be viewable by the camera system in one of the orientations. Thus, the motion will only be present within the video captured by the camera in one orientation, and need not be synchronized between video data captured by adjacent wedges. The safe action zone may be designated in some manner for the benefit of actors and other personnel. According to one embodiment, the camera system may project a laser to indicate one or both boundaries of the safe action zone.

In order to facilitate proper combination of the wedge videos, the camera system may be calibrated. This process may include positioning a calibration chart within the safe action zone of each of the wedges, and within the overlapping space between each pair of neighboring safe action zones. Video depicting the calibration chart may be captured in sequence and used to generate a virtual camera system in which each virtual camera has characteristics, such as position and orientation, matching those of their counterparts during calibration. The virtual camera system may be used to facilitate the process of accurately combining the wedge videos into the combined video.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

FIGS. 7A through 12D depict various stages of a calibration process, according to one embodiment.

DETAILED DESCRIPTION

Figure 1:
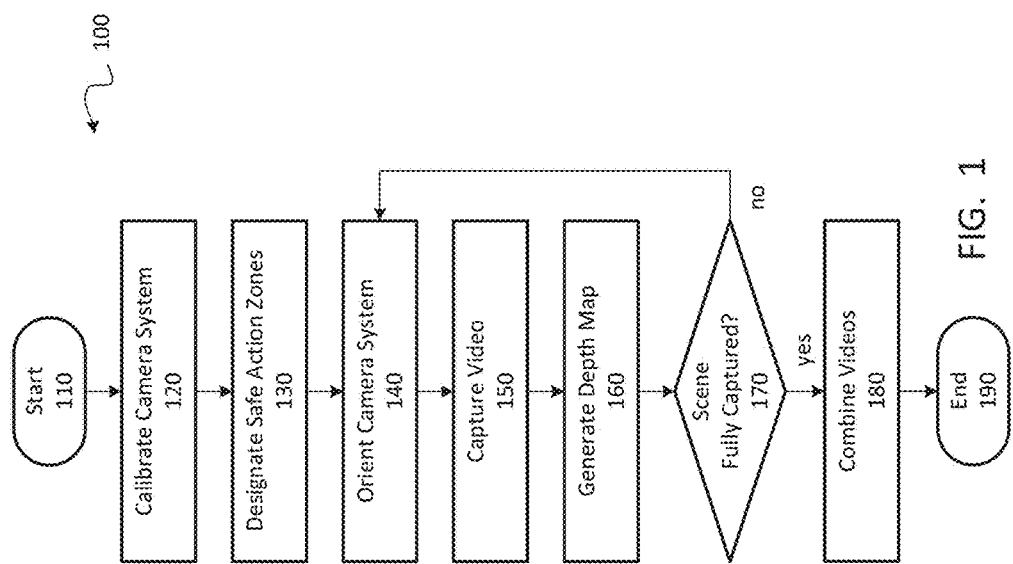
FIG. 1 is a flow diagram depicting a method for capturing a scene in wedge-shaped segments, according to one embodiment.

Multiple methods for capturing image and/or video data in a light-field volume and creating virtual views from such data are described. The described embodiments may provide for capturing continuous or nearly continuous light-field data from many or all directions facing away from the capture system, which may enable the generation of virtual views that are more accurate and/or allow viewers greater viewing freedom.

Definitions

For purposes of the description provided herein, the following definitions are used:

Augmented reality: an immersive viewing experience in which images presented to the viewer are based on the location and/or orientation of the viewer's head and/or eyes, and are presented in conjunction with the viewer's view of actual objects in the viewer's environment.

Combined video: a video in which videos and/or images captured separately from each other are combined together and presented as a single video.

Conventional image: an image in which the pixel values are not, collectively or individually, indicative of the angle of incidence at which light is received on the surface of the sensor.

Depth: a representation of distance between an object and/or corresponding image sample and the entrance pupil of the optics of the capture system.

Input device: any device that receives input from a user.

Light-field camera: any camera capable of capturing light-field images.

Light-field data: data indicative of the angle of incidence at which light is received on the surface of the sensor.

Light-field image: an image that contains a representation of light-field data captured at the sensor, which may be a four-dimensional sample representing information carried by ray bundles received by a single light-field camera.

Light-field volume: the combination of all light-field images that represents, either fully or sparsely, light rays entering the physical space defined by the light-field volume.

Portion of a scene: a subset of a scene.

Processor: any processing device capable of processing digital data, which may be a microprocessor, ASIC, FPGA, or other type of processing device.

Ray bundle, "ray," or "bundle": a set of light rays recorded in aggregate by a single pixel in a photosensor.

Scene: an arrangement of objects and/or people to be filmed

Sensor, "photosensor," or "image sensor": a light detector in a camera capable of generating images based on light received by the sensor.

Stereo virtual reality: an extended form of virtual reality in which each eye is shown a different view of the virtual world, enabling stereoscopic three-dimensional perception.

Tiled array: an arrangement of light-field cameras in which the light-field cameras are compactly and/or loosely, evenly and/or unevenly distributed about an axis and oriented generally outward to capture an environment surrounding the tiled array, with exemplary tiled arrays including ring-shaped arrays, spherical arrays, cubic arrays, and the like.

Virtual reality: an immersive viewing experience in which images presented to the viewer are based on the location and/or orientation of the viewer's head and/or eyes.

Virtual view: a reconstructed view, typically for display in a virtual reality or augmented reality headset, which may be generated by resampling and/or interpolating data from a captured light-field volume.

Virtual viewpoint: the location, within a coordinate system and/or light-field volume, from which a virtual view is generated.

Wedge-shaped portion: a portion that has a generally triangular or sectoral (slice of pie) shape.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data. Further, in this disclosure, the phrase "camera system" refers to any system including one or more conventional and/or light-field cameras and/or any related hardware, such as motors, mounts, input devices, and/or the like. Thus, a tiled array of light-field or conventional cameras is one of many types of camera systems.

In the following description, several systems and methods for capturing video are described. One skilled in the art will recognize that these various systems and methods can be performed singly and/or in any suitable combination with one another. Further, many of the configurations and techniques described herein are applicable to conventional imaging as well as light-field imaging. Further, although the ensuing description focuses on video capture for use in virtual reality or augmented reality, the systems and methods described herein may be used in a much wider variety of video applications.

Wedge-Based Video Capture

As described previously, the equipment and personnel that need to be present on the set can present a challenge for 360° immersive video, which should ideally be presented without the presence of such equipment or personnel in order to help the viewer remain immersed in the experience. Accordingly, in some embodiments, panoramic video may be captured in segments, which may subsequently be stitched together to generate the combined video. The combined video may provide 360° immersion with the ability to generate viewpoint video for any viewpoint within a viewing volume, at which the viewer positions his or her head.

Referring to FIG. 1, a flow diagram depicts a method 100 for capturing a scene in wedge-shaped segments, according to one embodiment. As shown, the method 100 may start 110 with a step 120 in which the camera system is calibrated. This may entail ensuring that the camera system is accurately positioned and/or oriented relative to the action to be captured.

In a step 130, safe action zones may be designated. Each safe action zone may indicate a zone within which motion will not interfere with capture of video in an adjoining segment, as will be described subsequently.

In a step 140, the camera system may be oriented toward a portion (for example, a first portion) of the scene to be captured. Optionally, the camera system may again be calibrated, for example, by repeating the step 120. In some embodiments, only a partial calibration may be needed after reorientation of the camera system. Thus, some, but not necessarily all of the calibration procedures performed pursuant to the step 120 may be carried out.

Then, in a step 150, video may be captured with the camera system in the orientation provided in the step 140. In a step 160, a depth map may be generated for the same portion of the scene (for example, the first portion).

Pursuant to a query 170, a determination may be made as to whether the scene has been fully captured. If not, the method 100 may return to the step 140, in which the camera system is oriented toward another portion (for example, a second or subsequent portion) of the scene to be captured. Then, the step 150 and the step 160 may be performed for the portion of the scene at which the camera system is oriented.

Thus, the step 140, the step 150, and the step 160 may be repeated until video and/or a depth map has been captured for all portions of the scene. Then, the query 170 will be answered in the affirmative, and the method 100 may proceed to a step 180 in which the videos captured in each iteration of the step 150 are combined together to generate a combined video depicting the entire scene. The depth map generated in each iteration of the step 160 may optionally be used in the course of performing the step 180. The method 100 may then end 190.

The steps of the method 100 may be reordered, omitted, replaced with alternative steps, and/or supplemented with additional steps not specifically described herein. The steps set forth above will be shown and described in greater detail subsequently.

The method 100 may be carried out through the use of any of a wide variety of camera systems. According to some embodiments, a camera system in the form of a camera array may be used. Various types of camera arrays may be used, including but not limited to tiled camera arrays, hemispherical arrays, semispherical arrays defining less than a hemisphere, planar arrays, and/or the like. This disclosure focuses on the use of planar arrays; however, those of skill in the art will recognize that the methods set forth herein may readily be extended to other camera array types. One exemplary planar camera array will be shown and described in connection with FIG. 2.

Planar Camera Arrays

Figure 2:
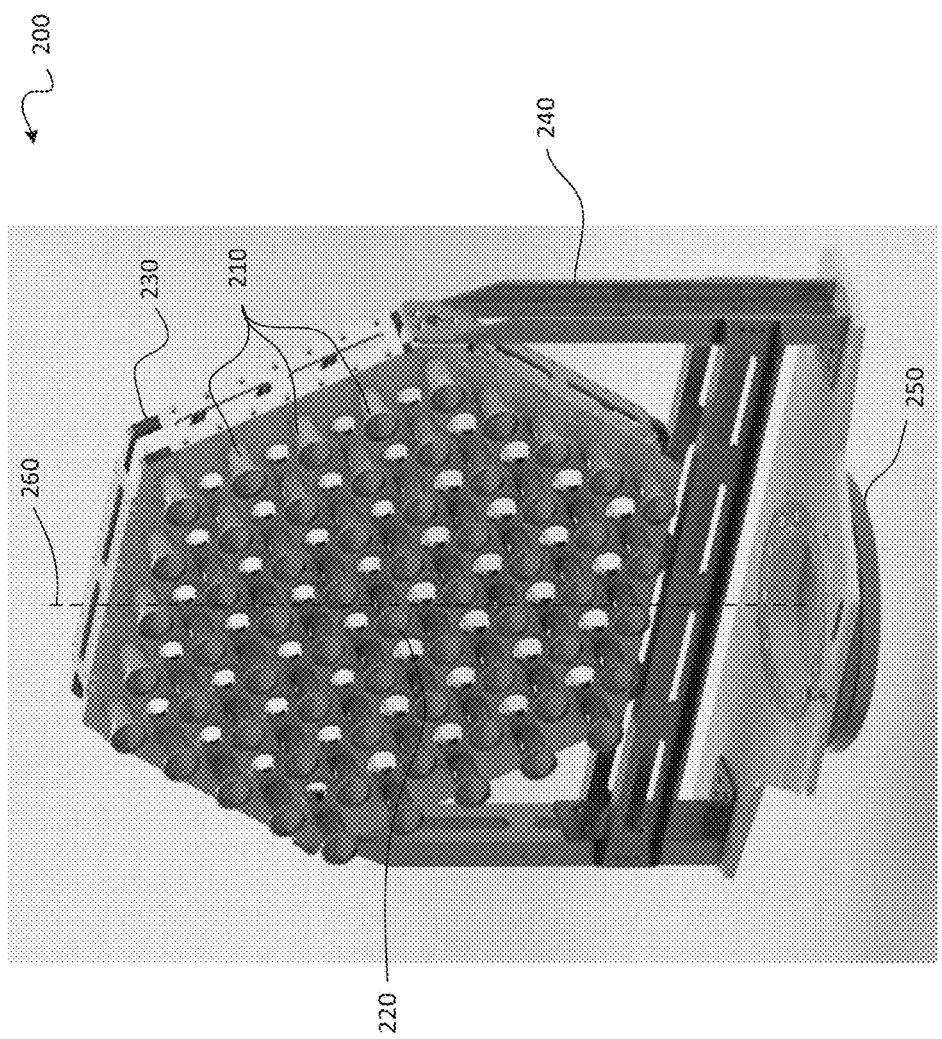
FIG. 2 depicts a camera system, according to one embodiment.

Referring to FIG. 2, a camera system 200 is shown, according to one embodiment. The camera system 200 may contain a set of cameras 210, which may be arranged to define a planar array having a generally hexagonal shape. Each of the cameras 210 may be a plenoptic light-field camera as described above, or a conventional camera of any type known in the art. The data captured by the cameras 210 may be combined to define a light-field even if the cameras 210 are conventional cameras. The cameras 210 may include a central camera 220, which may be positioned at the center of the planar array. According to some examples, each of the cameras 210 may have a field-of-view encompassing an angle of 90°, both vertically and horizontally. The camera system 200 may optionally have a synchronization trigger (not shown) that can be used to automatically activate the camera system 200, audio recording equipment, and/or audio playback equipment to facilitate synchronization of the video captured by the camera system 200 with audio and/or video captured by the camera system 200 at different orientations.

The cameras 210 may be secured to a plate 230, which may be rotatably coupled to a frame 240. The plate 230 may be selectively angled relative to the frame 240 to permit the cameras 210 to be oriented horizontally as shown, or tilted upward or downward. The frame 240 may be rotatably coupled to a base 250. A motor (not shown) may optionally be coupled to the frame 240 to rotate the frame 240 relative to the base 250. The rotation may be about an axis 260 that passes through a nodal point of the central camera 220.

The camera system 200 may be readily usable with the method 100 of FIG. 1. The ability to rotate the frame 240 on the base 250 may enable the camera to be easily oriented each time the step 140 is performed. Further, the cameras 210 may be used to capture volumetric video, permitting the view to be generated from any viewpoint within a viewing volume, as determined by the position and/or orientation of the viewer's head. Thus, the camera system 200 may be used to facilitate video capture for virtual reality, augmented reality, and/or other interactive applications.

The following description references the camera system 200 of FIG. 2. However, it is to be understood that reference to the camera system 200 is merely exemplary; the methods and techniques set forth herein could alternatively be carried out with any of a wide variety of camera systems.

Five-Wedge Video Capture

According to certain examples, a camera system such as the camera system 200 of FIG. 2 may be used to capture a scene via sequential capture of five wedge-shaped portions of the scene. The five videos captured may be combined in the step 180 to generate a combined video depicting a 360° view of the scene. Capture of five wedge-shaped portions is merely exemplary; those of skill in the art will recognize that a camera system may be used to capture a scene divided into a different number of portions, which may not necessarily be wedge-shaped. A camera system used to capture a different number of wedges (for example, two, three, four, six, seven, or eight wedges) may have a different field-of-view, or may have the same field-of-view as the camera system 200 of FIG. 2. Capture of five wedge-shaped portions will be further shown and described in connection with FIG. 3.

Figure 3:
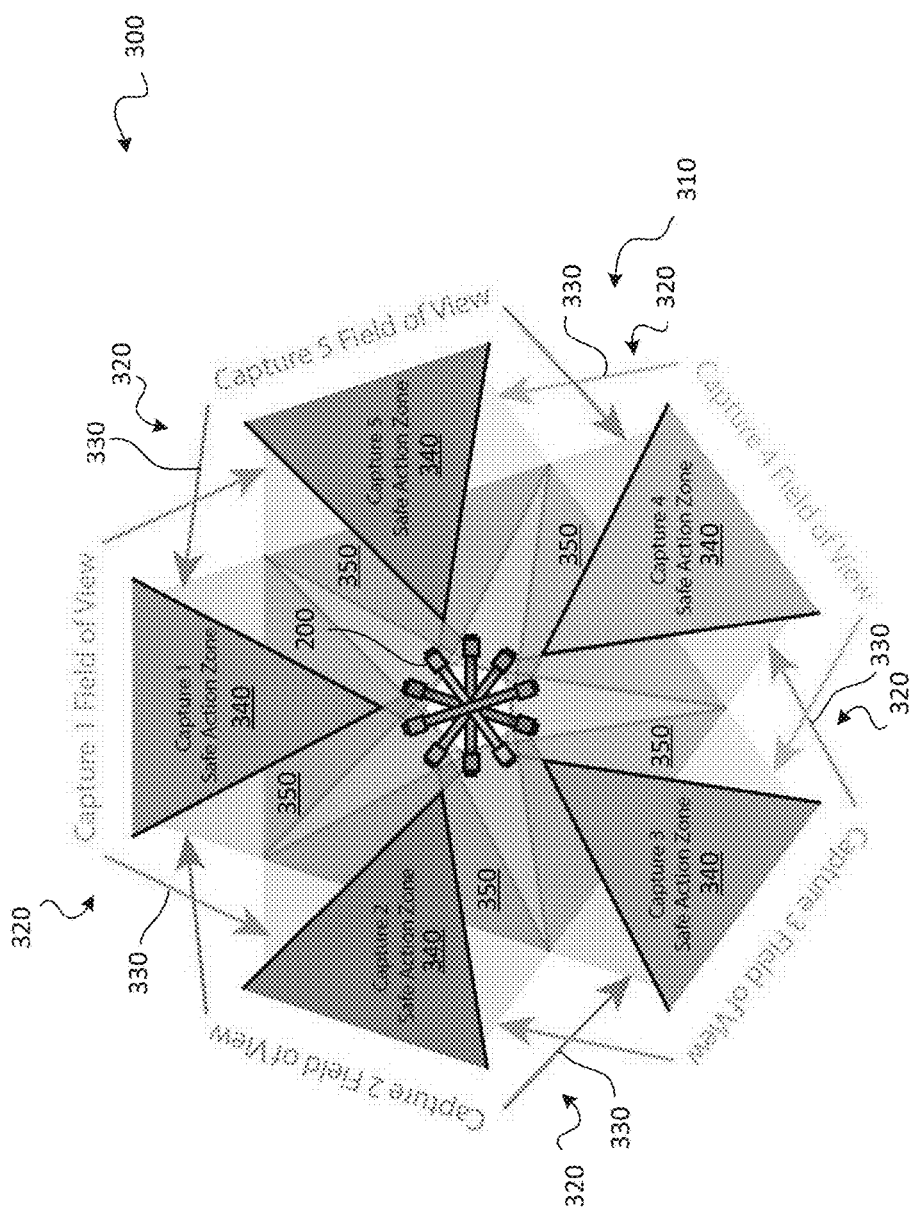
FIG. 3 is a diagram depicting the use of a camera system of FIG. 2 to capture a 360° view of a scene in five wedge-shaped portions, according to one embodiment.

Referring to FIG. 3, a diagram 300 depicts the use of a camera system 200 as set forth in the description of FIG. 2 to capture a 360° view of a scene 310 in five wedge-shaped portions 320, according to one embodiment. As shown, each of the wedge-shaped portions 320 may have a field-of-view 330, which may include the fields-of-view of all of the cameras 210 of the camera system 200. The cameras 210 at the left and right points of the hexagonal shape of the planar array of cameras 210 may define the horizontal extents of the field-of-view 330 for each of the wedge-shaped portions 320.

Further, each of the wedge-shaped portions 320 may have a safe action zone 340 that is a subset of the field-of-view 330 for that wedge-shaped portion 320. The safe action zone 340 for a wedge-shaped portion 320 may be the portion of the field-of-view 330 for that wedge-shaped portion 320 that is not included in the field-of-view 330 of any other wedge-shaped portion 320. Outside of the safe action zones 340, each field-of-view 330 may include two overlapping portions 350, each of which overlaps with the field-of-view 330 of the adjacent wedge-shaped portion 320. Safe action zones will be described in greater detail subsequently.

As shown, the camera system 200 may be rotated sequentially so that it captures video each wedge-shaped portion 320 in sequence. Thus, the camera system 200 may first be oriented to capture the field-of-view 330 labeled "Capture 1" Then, the camera system 200 may be rotated such that the camera system 200 is oriented to capture the field-of-view 330 labeled "Capture 2," and then rotated in like manner to capture the fields-of-view 330 labeled "Capture 3," "Capture 4," and "Capture 5." This will be further shown and described in connection with an example in FIGS. 4 through 6B.

EXAMPLE

Figure 4:
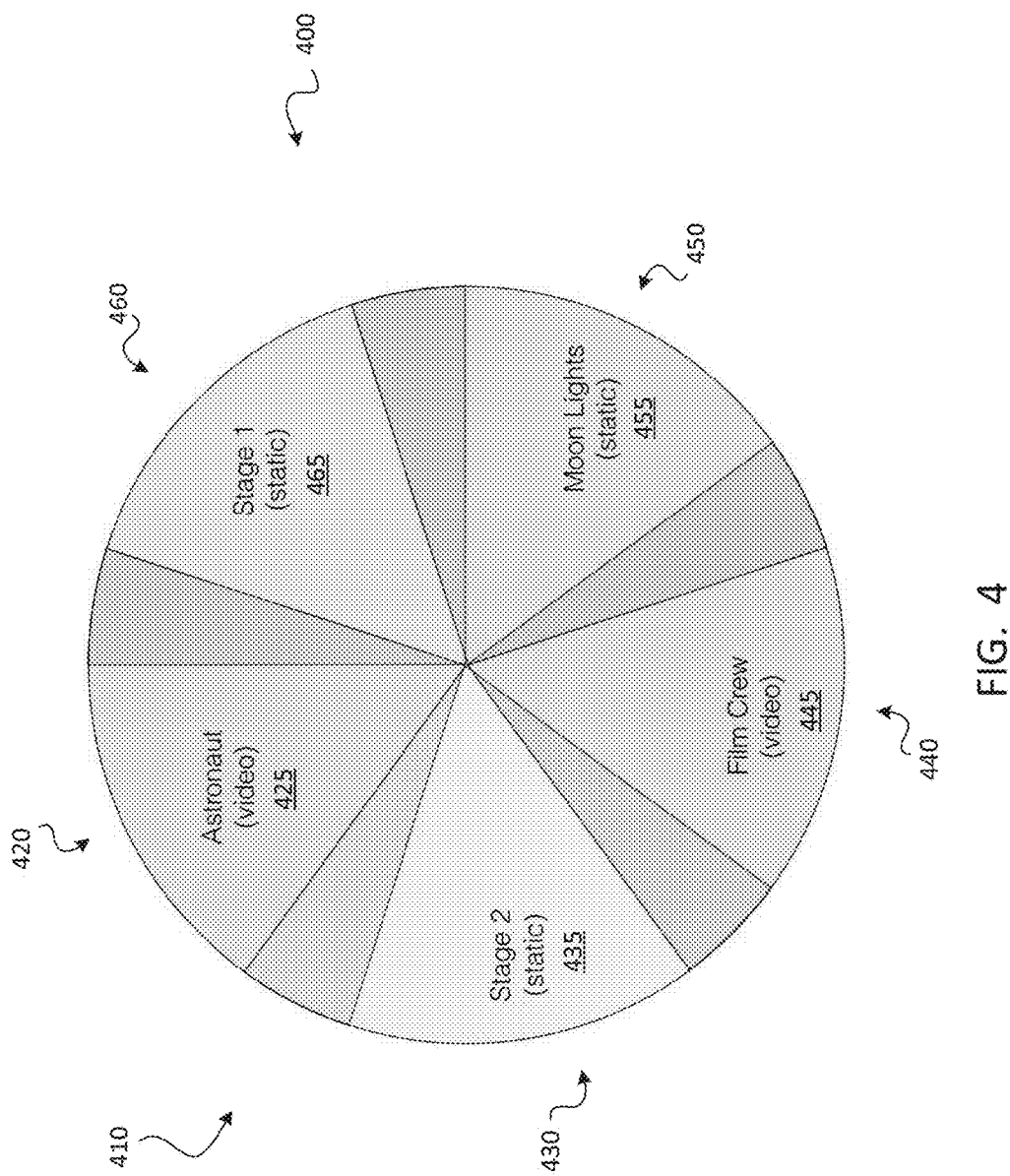
FIG. 4 is a diagram depicting the layout of a scene, according to one embodiment.
Figures 5A, 5B, 5C, 5D, 5E:
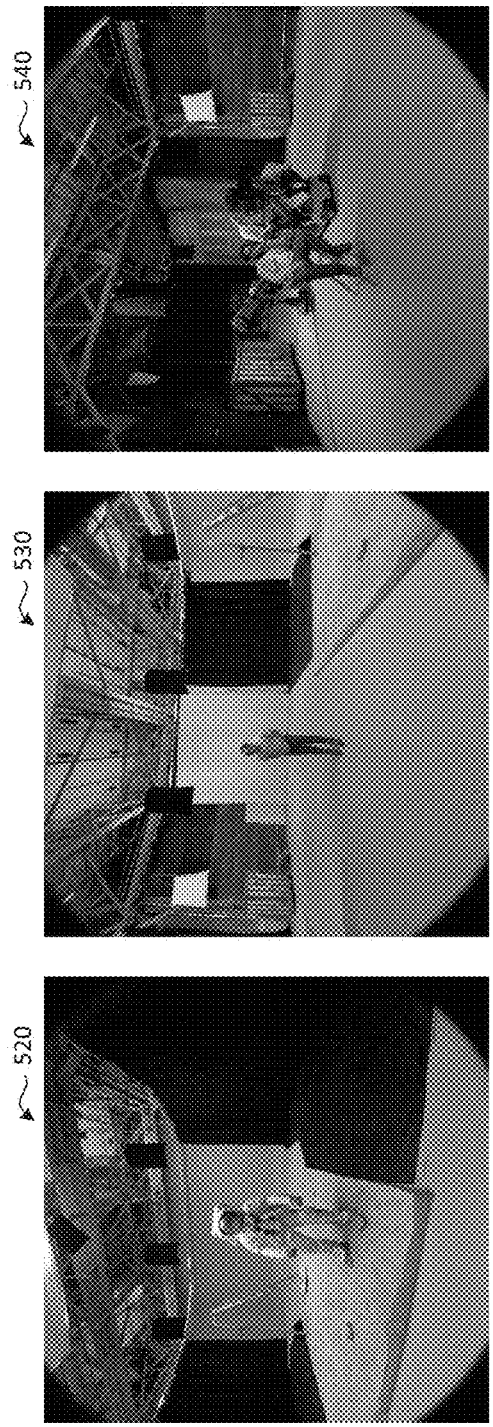
FIGS. 5A through 5E are a series of screenshot diagrams depicting views captured by a camera system that rotates within the scene of FIG. 4, according to one embodiment.

Referring to FIG. 4, a diagram 400 depicts the layout of a scene 410 according to one embodiment. The scene 410 may be a moon landing scene to be filmed in 360°, for example, for a virtual reality experience in which the viewer is able to simulate his or her presence on the filming set. The camera system 200 (not shown) may be positioned proximate the center of the scene 410. The scene 410 may include five wedge-shaped portions like those of the diagram 300 of FIG. 3. Thus, the scene 410 may be divided into a first portion 420, a second portion 430, a third portion 440, a fourth portion 450, and fifth portion 460. The first portion 420 may have a first safe action zone 425, the second portion 430 may have a second safe action zone 435, the third portion 440 may have a third safe action zone 445, the fourth portion 450 may have a fourth safe action zone 455, and the fifth portion 460 may have a fifth safe action zone 465.

As shown in FIG. 4, the first portion 420 may depict an astronaut, the second portion 430 may depict a portion of the stage, the third portion 440 may depict the crew filming the scene with the astronaut, the fourth portion 450 may depict lights illuminating the astronaut and moon seen of the first portion 420, and the fifth portion 460 may depict another portion of the stage. The first portion 420 and the third portion 440 may be captured in video, as there is motion occurring in these scenes. In the second portion 430, the fourth portion 450, and the fifth portion 460, objects may be static; accordingly, these portions may each optionally be captured with a single image rather than with video. The single image may be combined with each frame of the video captured for the first portion 420 and the third portion 440 to generate the combined video.

Referring to FIGS. 5A through 5E, a series of screenshot diagrams depict views captured by a camera system 200 that rotates within the scene 410 of FIG. 4, according to one embodiment. The screenshot diagrams may include a first screenshot diagram 520, a second screenshot diagram 530, a third screenshot diagram 540, a fourth screenshot diagram 550, and a fifth screenshot diagram 560 depict images that may be captured by the camera system 200 when oriented toward the first portion 420, the second portion 430, the third portion 440, the fourth portion 450, and the fifth portion 460, respectively. These screenshot diagrams are shown prior to post-production.

As mentioned previously, the video and/or images captured by the camera system 200 when oriented toward each of the portions of the scene 410 may be combined to generate a combined video. Depth information indicative of the distance of objects from the camera system 200 may optionally be captured and used to facilitate this process and/or the process of adding computer-generated elements to the combined video. Generation of the combined video will be described in greater detail subsequently.

Figure 6A:
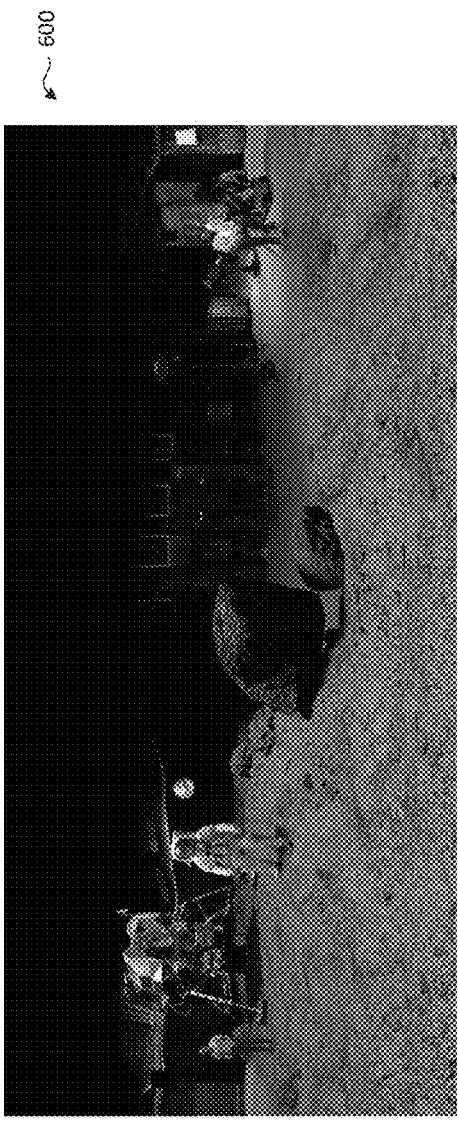
FIGS. 6A and 6B are screenshot diagrams depicting a frame from a combined video and a frame from a combined depth map, respectively, of the scene of FIG. 4, according to one embodiment.
Figure 6B:
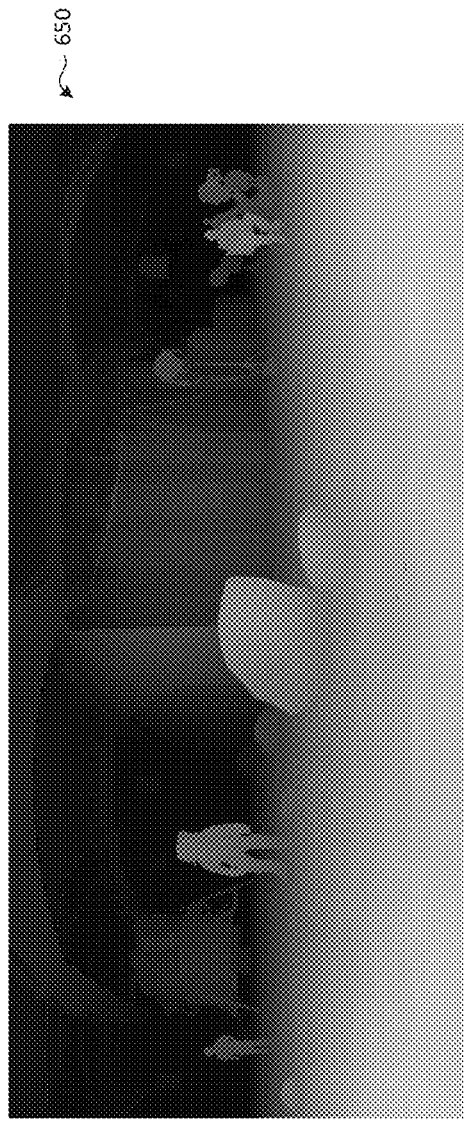
Figure 7A:
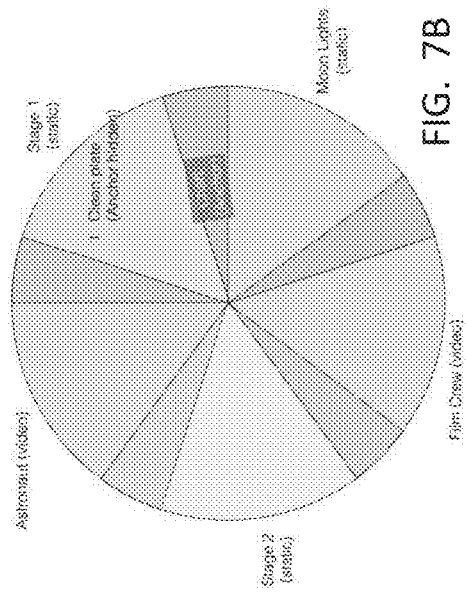
Figure 7B:
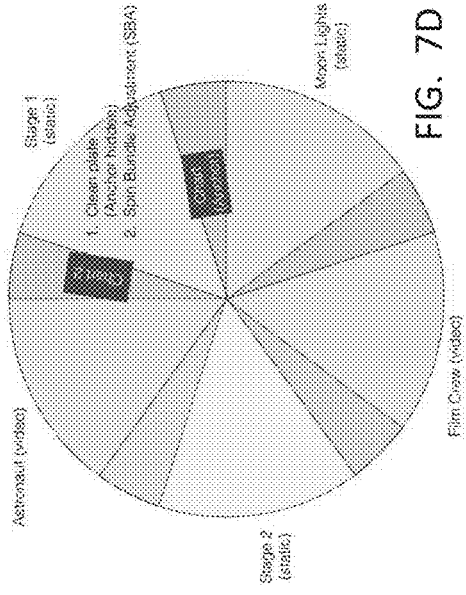
Figure 7C:
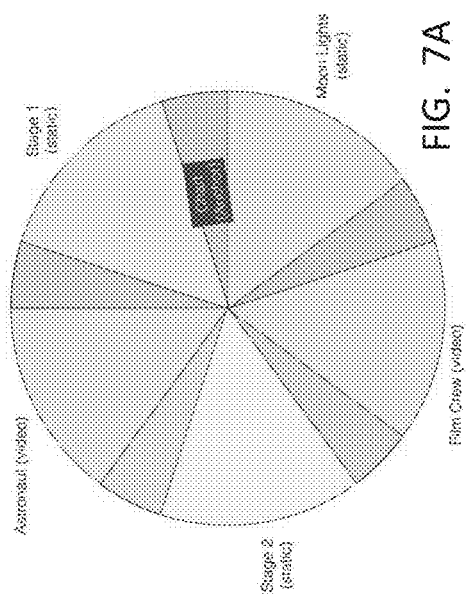
Figure 7D:
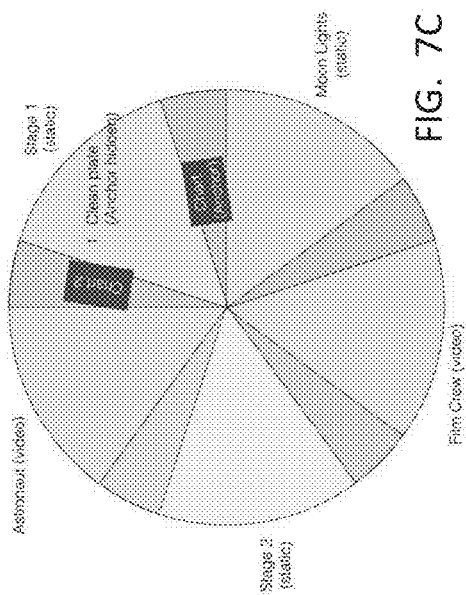
Figure 8B:
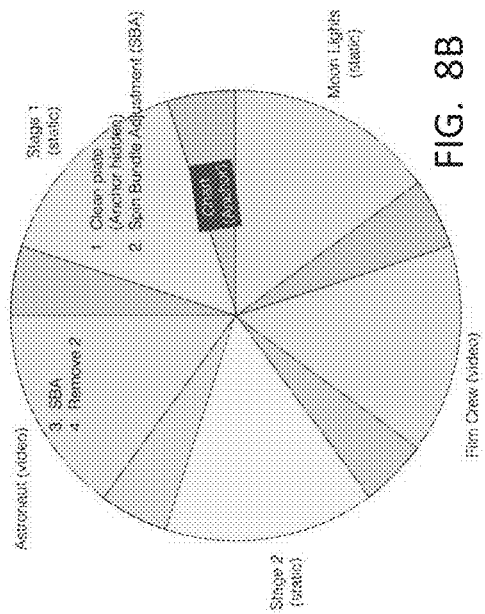
Figure 8D:
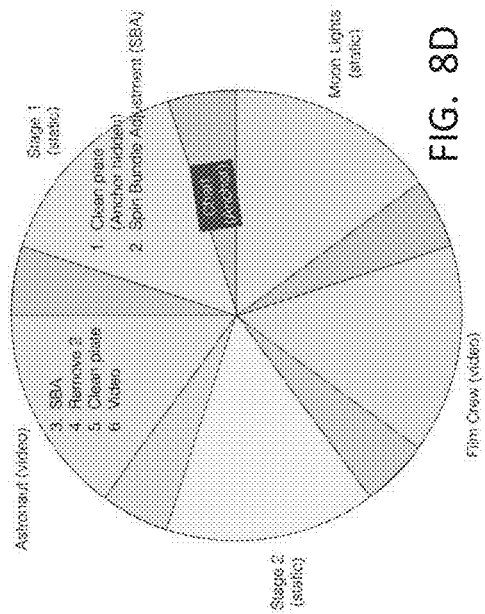
Figure 8A:
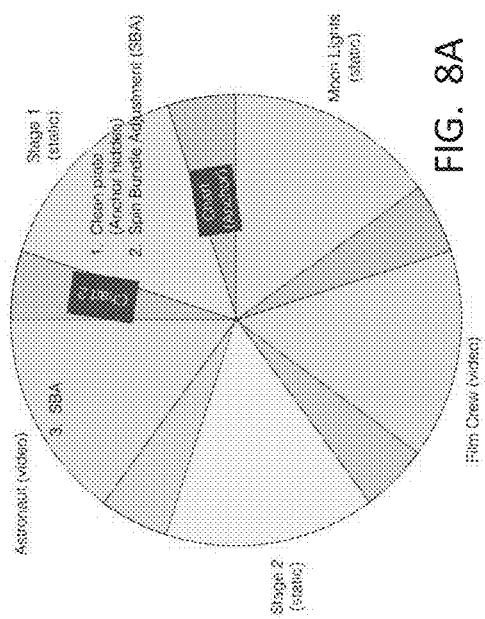
Figure 8C:
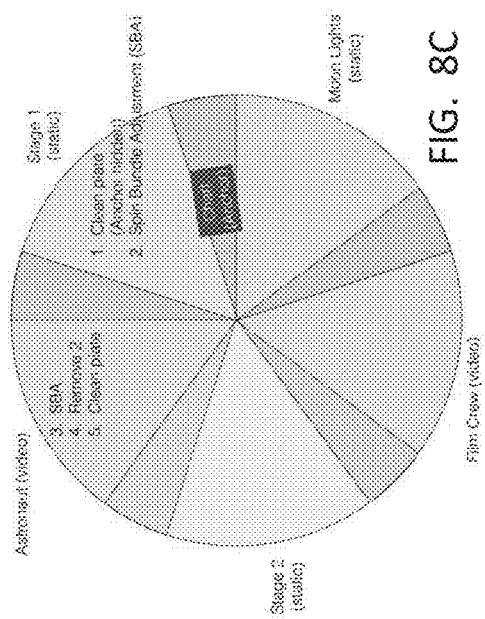
Figure 9B:
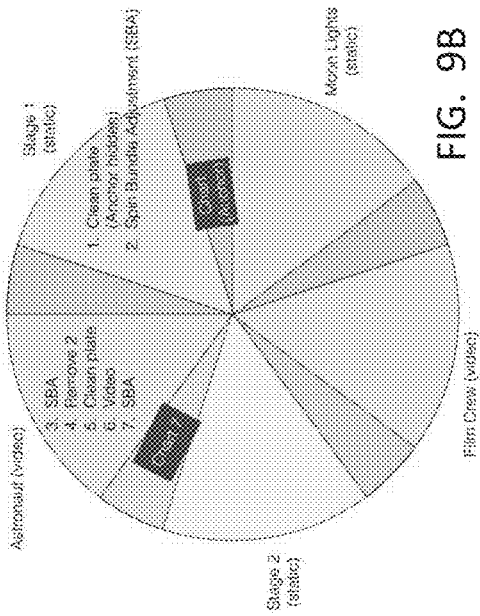
Figure 9D:
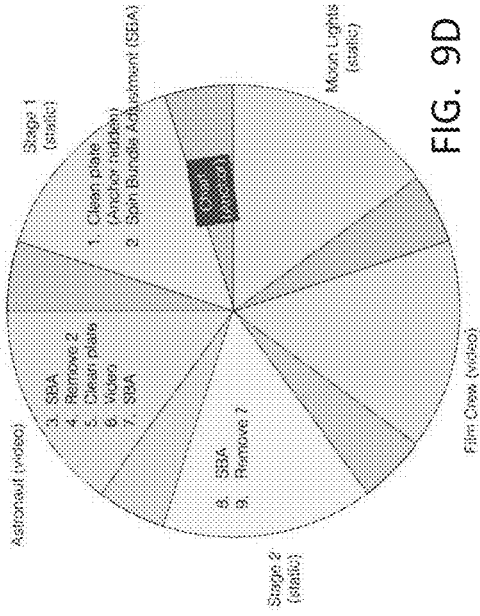
Figure 9A:
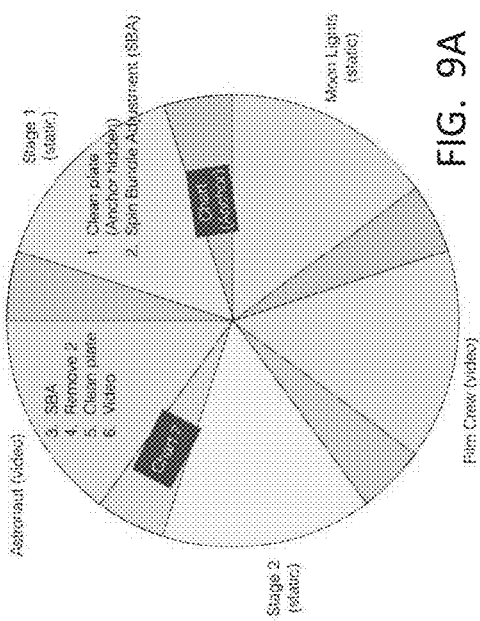
Figure 9C:
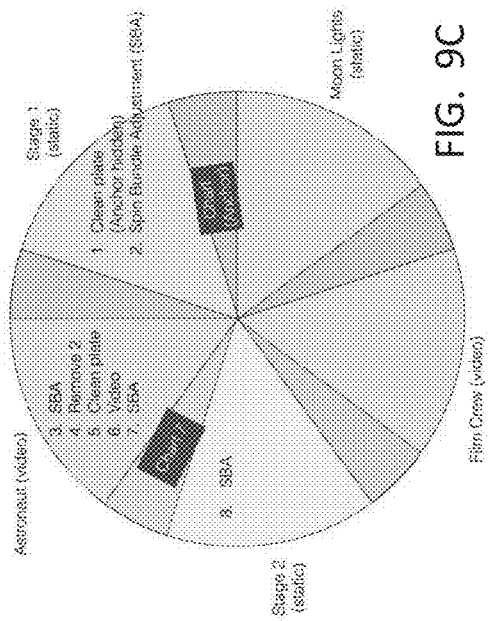
Figure 11A:
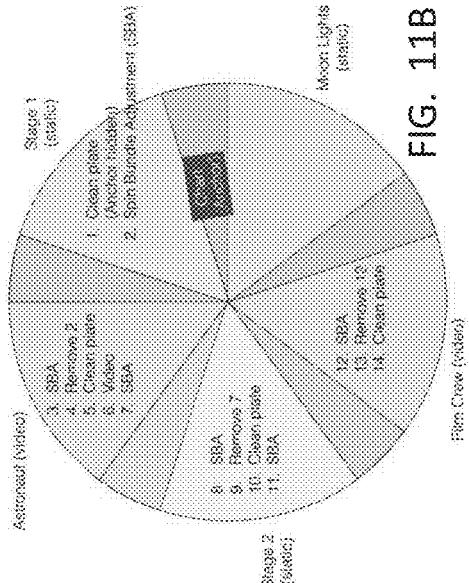
Figure 11B:
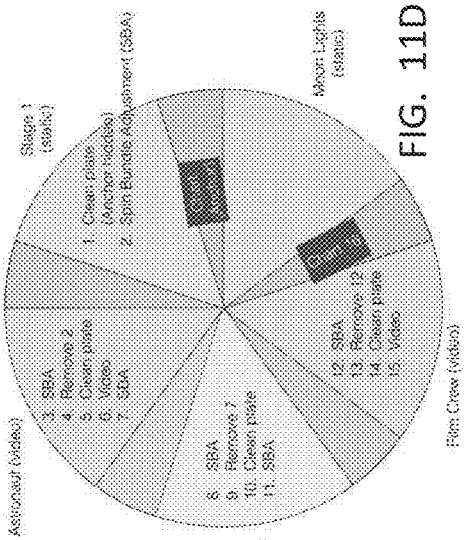
Figure 11C:
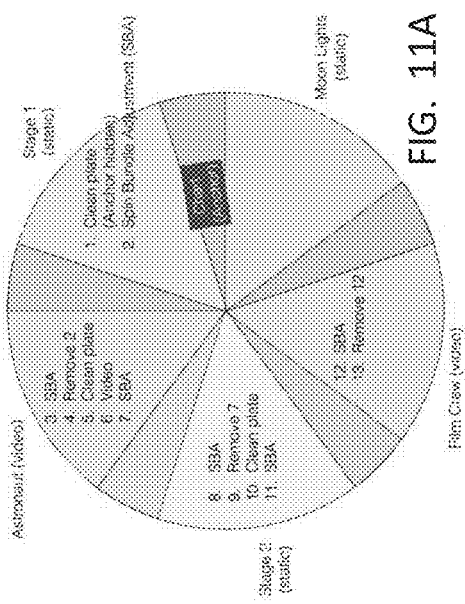
Figure 11D:
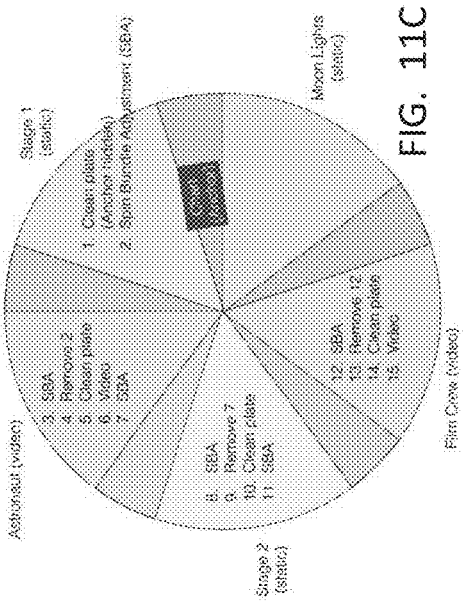

Referring to FIGS. 6A and 6B, a screenshot diagram 600 and a screenshot diagram 650 depict a frame from a combined video and a frame from a combined depth map, respectively, of the scene 410 of FIG. 4, according to one embodiment. The images and/or videos captured by the camera system 200 in each orientation may be combined together relatively seamlessly in post-production to generate the combined video that constitutes video of the scene 410 in 360°, as depicted in the screenshot diagram 600. The screenshot diagram 600 does not show significant duplicative inclusion of any of the overlapping portions 350 (as depicted in FIG. 3) between camera system orientations. The screenshot diagram 600 may appear to a viewer to be a substantially seamless 360° view of the scene.

As shown, some computer-generated elements may be added to the combined video, such as the moon lander. In the screenshot diagram 600, various real-world elements, such as the camera crew and lighting components, have been left in place to depict the filming process. However, for a more immersive experience, these elements may be replaced with other images and/or video, or with other computer-generated elements.

Some objects that do not have clear, distinct edges in video may have clearer edges in a depth map, such as may be obtained through the use of LiDAR, light-field image processing, active illumination techniques using visible or invisible light, and/or other known techniques, as in the step 160. Use of LiDAR is shown and described in U.S. Provisional Application Ser. No. 62/359,022 for "Combining Light-Field Data with Active Depth Data for Depth Map Generation,", filed Jul. 6, 2016, the disclosure of which is incorporated herein by reference in its entirety. Thus, use of a depth map, such as that depicted in the screenshot diagram 650, may facilitate proper alignment, with each other, of the images and/or videos captured by the camera system 200 in its various orientations. Further, such a depth map may be used to position a computer-generated object at the proper depth within the scene. For example, the moon lander may be positioned in front of the sky, but behind the astronaut so that the moon lander is properly occluded by the astronaut, but not the sky.

Camera System Calibration

Having the camera system 200 precisely calibrated may facilitate the process of combining the videos for the various portions of a scene by making the overlapping portions 350 of the various portions line up more precisely with each other when superimposed during post-production. Various processes may be used to undertake such calibration in the step 120. One embodiment will be shown and described herein, with reference to FIGS. 7A through 12D.

According to one embodiment, accurate spin may be accomplished by having the center of rotation of the camera system 200 aligned mechanically to the nodal point of the central camera 220, as discussed in connection with FIG. 2. Degrees of rotation may be referenced through the use of a protractor mounted at a fixed location, such as on the floor around the camera system 200. The protractor may have any suitable degree of accuracy, such as for example an accuracy of 0.1°. Final adjustment of the orientation of the camera system 200 may be accomplished through the use of a fine degree gear (not shown). The camera system 200 may be locked in a given orientation through the use of a friction lock (not shown).

Once the camera system 200 has been set up in this manner and oriented at a desired orientation (such as the orientation needed to capture images and/or video from one of the wedge-shaped portions of the scene 410), a reference laser mounted on the camera system 200 may be activated. The point illuminated by the laser may then be marked and as used a reference mark to return to on subsequent rotations so that the camera system 200 may be returned to the same orientation with a high degree of precision.

Once the camera system 200 has been positioned and set up above, calibration may be carried out. Through the use of an exemplary calibration process, one or more calibration charts may be strategically positioned throughout a 360° field-of-view to be captured. The calibration charts may be captured and the resulting images and/or video may be used to mathematically infer the precise rotational and translational functions for the five wedge-shaped portions of the scene.

Specifically, the calibration chart may have a checkerboard configuration, a circle grid, or the like. The calibration chart may be placed on a flat surface and positioned at an optimal distance from the camera system 200, such as 1.5 to 2.5 meters away from the camera system 200. The calibration process may include, for example, two different types of calibration; "plate-bundle" and "spin-bundle". In plate-bundle, for each of the wedge-shaped portions of the scene, a collection of still-images (for example, 10) of the calibration chart may be captured with the camera system 200. Each of the ten shots may capture the calibration chart at a different position, orientation and/or distance from camera in the field-of-view of the camera system 200. In spin-bundle, one or more charts may be placed in a location visible to the capture system both in the current configuration, and also the configuration for the subsequent wedge. Still images of the chart(s) are then captured by the camera system in both configurations. The task of creating and/or updating a joint set of camera models based on captured image data may be performed using an approach called "bundle adjustment". (for example, see https://en.wikipedia.org/wiki/Bundle_adjustment)

In some embodiments, the calibration data obtained through the use of the calibration process may be used to generate a virtual camera system with virtual cameras that generally match the cameras 210 of the camera system 200 in terms of layout and operation. In the calibration process, the positions, orientations, fields-of-view, and/or other data for each of the cameras of the virtual camera system may be established. This process may involve capturing images of the calibration chart in the overlapping portions outside the safe action zones of the wedge-shaped portions of the scene.

Referring to FIGS. 7A through 12D, various stages of a calibration process are depicted, according to one embodiment. These drawings are based on the exemplary scene 410 of FIG. 4. The calibration process may proceed as follows:

1) First wedge-shaped portion (FIGS. 7A through 7D):
   a) Capture 10 plate-bundle shots;
   b) Place the calibration chart in the overlapping portion at which the fields-of-view of the first and second wedge-shaped portions overlap with each other so that it can be seen by the camera system when oriented toward either of the first and second wedge-shaped portions (this is the spin-bundle position);
   c) Capture the chart; and
   d) With the chart position fixed, rotate the camera system toward the second wedge-shaped portion.
2) Second wedge-shaped portion (FIGS. 8A through 9B):
   a) Capture the chart from the spin-bundle position;
   b) Capture 10 plate-bundle shots;
   c) Place the calibration chart in the spin-bundle position at which the second and third wedge-shaped portions overlap with each other;
   d) Capture the chart; and
   e) With the chart position fixed, rotate the camera system toward the third wedge-shaped portion.
3) Third wedge-shaped portion (FIGS. 9C through 10C):
   a) Capture the chart from the spin-bundle position;
   b) Capture 10 plate-bundle shots;
   c) Place the calibration chart in the spin-bundle position at which the third and fourth wedge-shaped portions overlap with each other;
   d) Capture the chart; and
   e) With the chart position fixed, rotate the camera system toward the fourth wedge-shaped portion.
4) Fourth wedge-shaped portion (FIGS. 10D through 12A):
   a) Capture the chart from the spin-bundle position;
   b) Capture 10 plate-bundle shots;
   c) Place the calibration chart in the spin-bundle position at which the fourth and fifth wedge-shaped portions overlap with each other;
   d) Capture the chart; and
   e) With the chart position fixed, rotate the camera system toward the fifth wedge-shaped portion.
5) Fifth wedge-shaped portion (FIGS. 12B through 12D):
   a) Capture the chart from the spin-bundle position;
   b) Capture 10 plate-bundle shots;
   c) Place the calibration chart in the spin-bundle position at which the fourth and fifth wedge-shaped portions overlap with each other;
   d) Capture the chart; and e) With the chart position fixed, rotate the camera system toward the first wedge-shaped portion.

6) First wedge-shaped portion: capture the chart from the spin-bundle position.

Using the checkerboard shots obtained in the six steps set forth above, the positions of the virtual cameras of the virtual camera system in each of the five orientations (i.e., oriented toward each of the five wedge-shaped portions of the scene) may be estimated simultaneously. Specifically, for a calibrated camera system with known focal distance, principal points, and undistortion parameters, the position of each virtual camera may be estimated relative to a checkerboard with a known geometric pattern. (for example, see OpenCV documentation for camera calibration, https://docs.opencv.org/2.4/doc/tutorials/calib3d/camera_calibration/camera_ca libration.html).

Accordingly, if a set of cameras can view the same checkerboard placed at the same location, the relative positions of the cameras in the set may be estimated. Each plate-bundle shot may be used to determine relative camera positions within one of the wedge-shaped portions. Each spin-bundle shot may be used to determine relative (virtual) camera positions in adjacent wedge-shaped portions.

The position of a checkerboard relative to the same checkerboard placed at a different location may also be estimated in a similar manner. For example, a calibrated camera positioned to view the checkerboard placed at both the locations may be used.

Using the data obtained in these steps, initial estimates of the positions of the 5*N camera positions may be obtained. Checkerboard positions may be placed at the second and subsequent locations relative to the checkerboard position placed at the first location. After the initial estimates have been obtained, bundle adjustment may be performed to fine-tune the estimated camera positions by minimizing the reprojection error between the projected three-dimensional positions of each checkerboard feature and the corresponding pixel location in the images capturing the feature.

Color Calibration

Color calibration may also be performed, in addition to calibration to ascertain the parameters of the virtual cameras of the virtual camera system. Color calibration may be included in the step 120. The color calibration procedure may ensure that colors are captured consistently and accurately. In some embodiments, color calibration may be carried out through the use of a color plate such as a color chart. In alternative embodiments, a clean plate, rather than a color plate, may be used.

Figure 13:
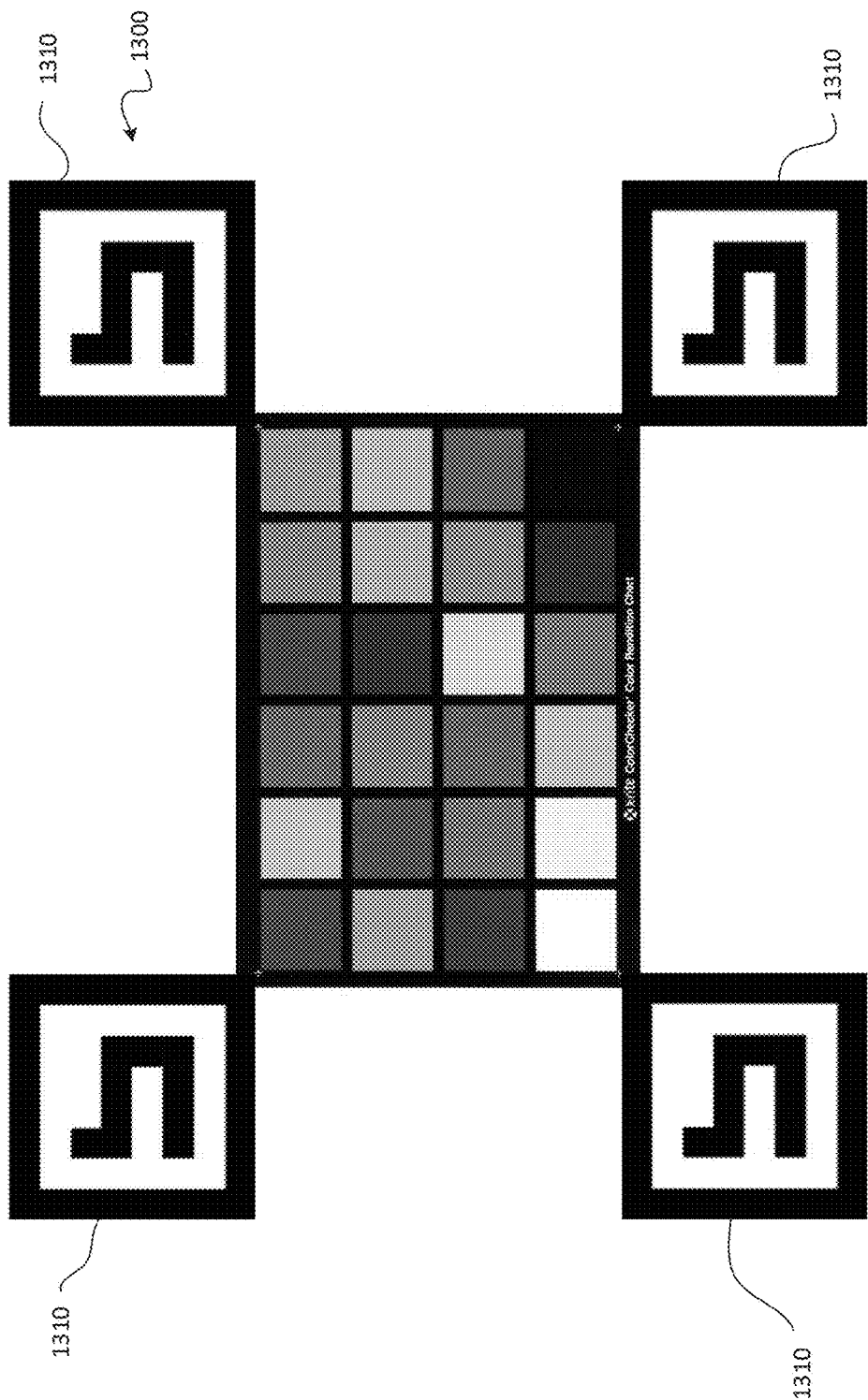
FIG. 13 depicts a color chart, according to one embodiment.

Referring to FIG. 13, a color chart 1300 is depicted, according to one embodiment. The color chart 1300 may have a series of different colors, as shown. To select color samples for color calibration, a specific color chart, such as the color chart 1300 of FIG. 13, may be designed for automatic processing. In some embodiments, a classic Macbeth color chart may be used as the color source. It may be placed on a flat board with four black and white markers 1310 on its four corners. The black and white markers 1310 may facilitate computer recognition of the color chart 1300 in images captured during the color calibration process. Additionally or alternatively, a gray card may be used to carry out color calibration, as will be shown and described in connection with FIG. 14.

Figure 14:
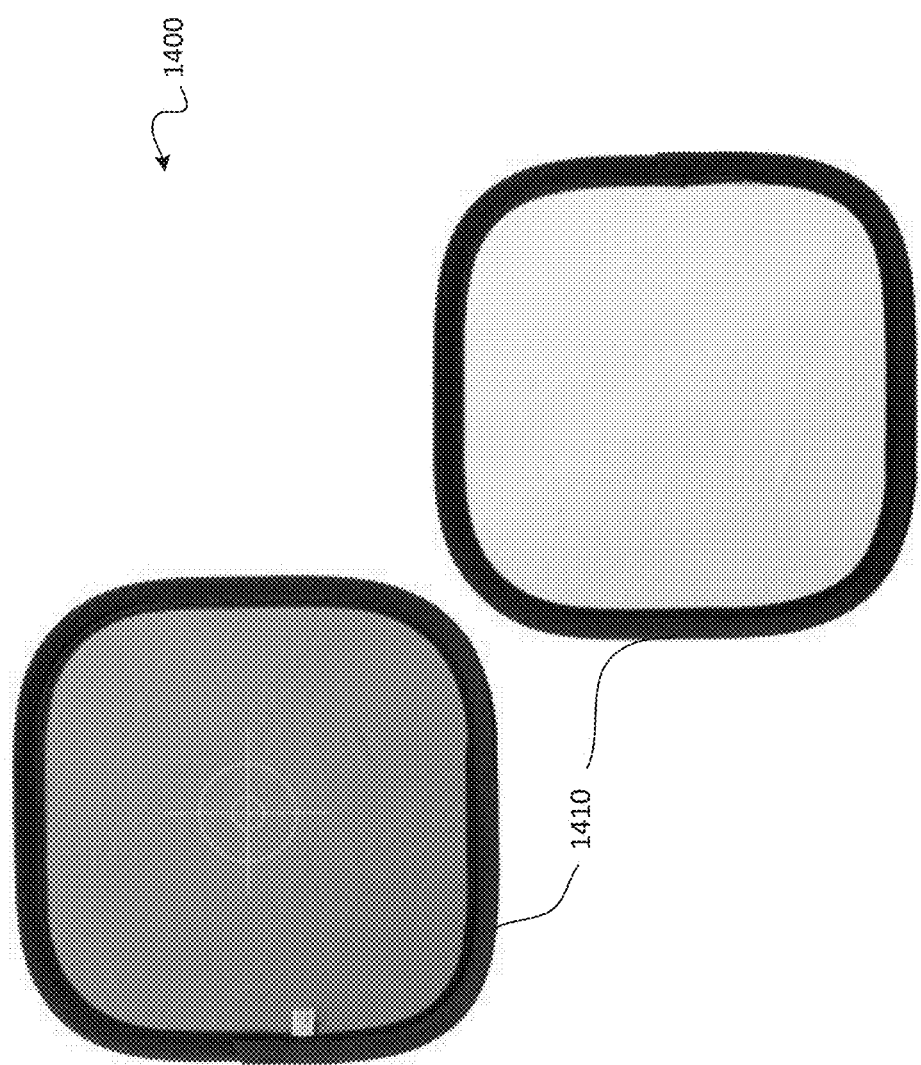
FIG. 14 depicts the two sides of a gray card, according to one embodiment.

Referring to FIG. 14, a diagram 1400 depicts the two sides of a gray card 1410, according to one embodiment. A color chart such as the color chart 1300 may be placed about one meter away from the camera system 200 and keep parallel to the plate 230 of the camera system 200. A reference camera of the cameras 210, such as the central camera 220, may face toward the center of the color chart 1300. Then, ten frames may be captured. The color chart 1300 may be left in position, and the gray card 1410 may be positioned to cover the color chart 1300 so that no color patches can be seen. Another ten frames may be captured to complete the image captures needed for color calibration. The various images captured may then be compared with each other and used to change settings of the camera system 200 and/or post-processing system as needed to complete the color calibration process.

Safe Action Zones

As mentioned previously, the field-of-view of each wedge-shaped portion of a scene may have a safe action zone that is only captured by the camera system 200 in one orientation. It may be desirable to have motion occur solely within the safe action zone, rather than in the overlapping portions on either side of the safe action zone, because that motion need not be replicated during capture of the adjacent wedge-shaped portions. This will be further shown and described in connection with FIG. 15.

Figure 15:
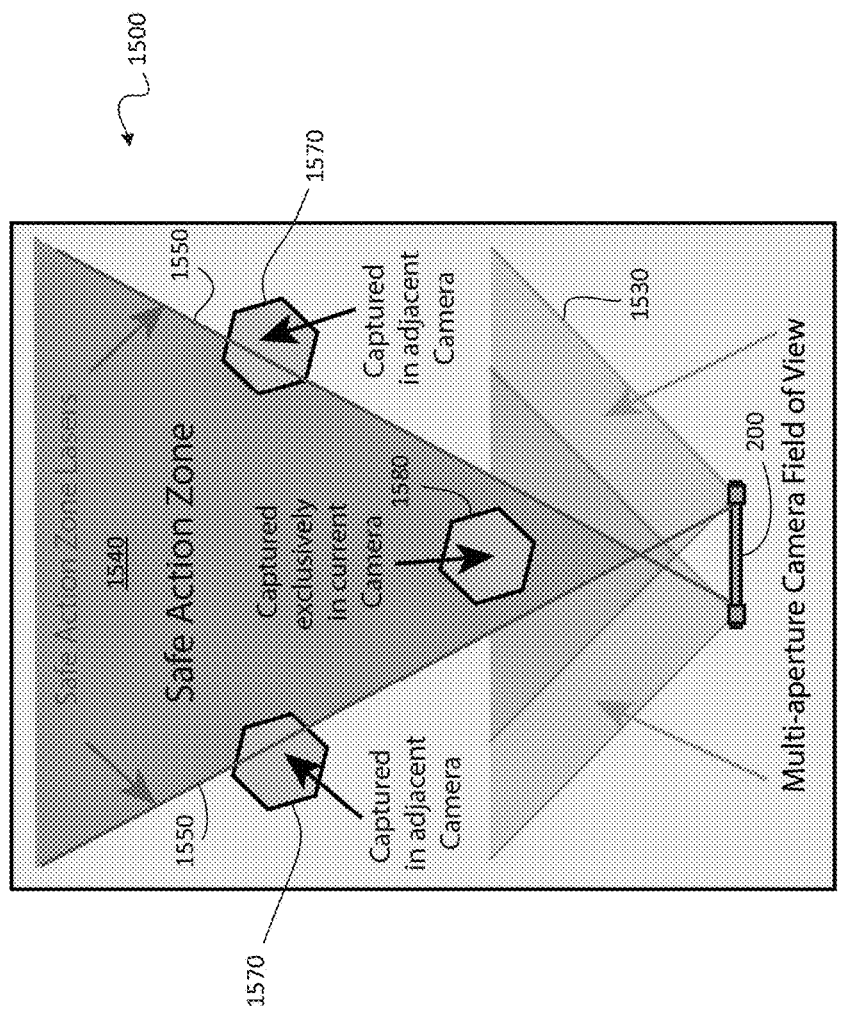
FIG. 15 depicts capture of a wedge-shaped portion of a scene, according to one embodiment.

Referring to FIG. 15, a diagram 1500 depicts capture of a wedge-shaped portion of a scene, according to one embodiment. As shown, the camera system 200 may have a field-of-view 1530 bounded by the edges of the fields-of-view of the cameras 210 positioned at the left and right tips of the hexagonal array. A safe action zone 1540 may reside within the field-of-view 1530, and may have wedge shape bounded by the fields-of-view of the camera system 200 when oriented toward the two adjacent wedge-shaped portions.

By way of example, the diagram 1500 depicts two peripheral objects 1570, each of which is positioned partially outside the safe action zone 1540. The diagram 1500 also depicts a central object 1580 that is positioned entirely within the safe action zone 1540. The central object 1580 will be exclusively by the camera system 200 in the current orientation, i.e., oriented toward the wedge-shaped portion of the scene in which the safe action zone 1540 resides. However, the peripheral objects 1570 are each positioned partially within the field-of-view of the camera system 200 when oriented toward the adjacent wedge-shaped portions; thus, errors will be introduced when the videos are combined together to generate the combined video depicting a 360° view of the scene.

In order to help keep action within the safe action zone 1540, it may be beneficial to designate and/or demarcate the safe action zone 1540 for the benefit of actors, directors, and/or other personnel, as in the step 130. This may be done, in some embodiments, through the use of lasers mounted to the camera system 200. The lasers may be mounted on the plate 230 and/or on the frame 240 so that the lasers rotate with the plate 230 to each orientation in which video is to be captured by the camera system 200. The lasers may project beams 1550 that indicate the horizontal edges of the safe action zone 1540.

Because scenes are often large, brightness for marking safe action zones may advantageously be at a level such that it is visible to the action on the filming set throughout the entire scene. The application of a tangential laser to the scene blocking mark, as one might see with a home laser level, may be effective for smaller scenes. However, in large areas, a more powerful light source may be needed to account for the fact that the power of the laser falls off exponentially with increasing distance from the source. Increasing the power of the laser runs the risk of creating an eye hazard and/or running afoul of regulations promulgated by OSHA and other regulatory bodies. Accordingly, in some embodiments, a mirror galvanometer may be used in conjunction with an eye safe laser. The mirror may be precisely positioned so as to provide a bright, visible dot that travels at high frequency along a predetermined pattern that indicates the boundary of the safe action zone. Such an approach may keep continuous brightness for visibility along a large area without resorting to the use of unsafe laser conditions on-set.

Safe action zone lasers may present a fast, accurate method for ensuring that action is restricted to a safe action zone within each of the wedge-shaped portions of a scene. As described above, the action within these safe action zones may be captured in a single orientation of the camera system 200, without any overlap with the fields-of-view of adjacent orientations of the camera system 200. Such safe action zone lasers may be pre-set for various fields of view, various degrees of rotation, and/or various aperture widths. Further, such safe action zone lasers may be used to indicate both horizontal and vertical safe action zones. Marking these zones using eye-safe laser methods may provide real-time set blocking for both talent and creatives that eliminates the need for significant reshoots and post-processing.

In the event that an actor or object leaves the safe action zone during video capture, the motion may optionally be removed in post-production. For example, parts of the video or image may be invalidated from the video or image from the adjoining wedge-shaped portion that did not see the action so that, during vantage generation, only select pixels from the valid edge would be visible.

Video Capture Process

Once the camera system 200 has been positioned and calibrated and safe action zones have been designated, video capture may be carried out, as in the step 150. In alternative embodiments, calibration may be carried out after video capture; designation of safe action zones is optional.

The capture process may consist of a timed capture per wedge-shaped portion for all five wedge-shaped portions of the scene. First, a single wedge-shaped portion of the scene may be set up, and all action may be staged within the safe action zone for that wedge-shaped portion. Single camera views may be used to check exposure and light flares; once these have been verified, that wedge-shaped portion of the scene may be captured and timed. The next step may be to clear actors and all moving objects from that wedge-shaped portion of the scene and capture a "clean plate," which may be a few seconds of video with no action.

The camera system 200 may then be rotated such that it is oriented toward the next wedge-shaped portion of the scene. The steps carried out above for the first wedge-shaped portion may be repeated for all remaining wedge-shaped portions. When all action and clean plates have been captured across all wedge-shaped portions of the scene, a final calibration capture may be carried out. This may include capture of a spin bundle and/or color calibration charts.

With this method of capture, the lighting and exposure may advantageously be kept consistent from one wedge-shaped portion to the next in order to obtain seamless alignment between wedge-shaped portions. Similarly, if there is a lighting transition, it may advantageously be carefully timed, with down-to-the-frame accuracy, in order to maintain consistency between wedge-shaped portions. Accordingly, a lighting transition applied during the capture of one wedge-shaped portion may advantageously be repeated during capture of each of the other wedge-shaped portions.

Capturing in this manner may allow the director to be on-set to direct all talent. When the scene consists of multiple wedge-shaped portions containing action, each piece of action may be carefully timed to the first piece of action captured. One method for doing this is to record audio of the first action captured and playback the captured audio for the other action pieces to act against. This may help to maintain consistency between action sequences captured at different times that are to be merged together to occur synchronously in the combined video.

Audio

During the video capture process, audio may be captured along with the video, at least for one or more of the wedges. If desired, the audio may be captured as a sound field in which the viewer's position affects the relative volume of sounds occurring in the scene. Multiple microphones may be distributed throughout the scene in order to accomplish this. As mentioned previously, audio for the first video sequence to be captured may be played for actors to act against in the capture of subsequent wedge-shaped portions. Audio from subsequent videos may also be captured and combined with that of the first video sequence in the combined video. Audio may be tied to the source in the combined video to enable viewer to experience realistic sound that varies depending on the position and/or orientation of his or her head.

In some embodiments, audio may be captured with a tetra microphone (with simplistic ambisonic processing) located at the camera plane, and also with lavalier microphones located on each actor. All audio sources may be mixed together with additional foley using mixing software such as Two Big Ears. Such software may optionally be integrated into a virtual reality player to facilitate accurate audio playback.

Combining Video

As mentioned previously, captured video and/or images may be stitched together to generate a combined video depicting a 360° view, as in the step 180. The video to be stitched together may be light-field video. The captured video and/or images may be stitched together in such a manner that the combined video is substantially without duplicative inclusion of any overlapping portions of the captured video and/or images. This means that any duplicative inclusion of overlapping portions is small enough that it does not detract in a meaningful way from the viewer's experience in viewing the combined video. In some embodiments, one of each pair of overlapping portions may be omitted. In other embodiments, each pair of overlapping portions may be blended together in a manner that provides the impression of a continuous image or video that spans the corresponding adjacent portions of the scene.

In some embodiments, light-field video stitching may be accomplished by treating the camera system 200, rotated toward the five different wedge-shaped portions, as one virtual camera that consists of all the cameras facing 5 different directions. For example, if the camera system 200 consists of N cameras 210, then the virtual camera rig with 5 rotations may consist of a total of 5×N cameras. The virtual camera may be used to accurately compare and/or otherwise evaluate the overlapping portions between adjacent viewpoints to facilitate the substantially seamless and non-duplicative combination mentioned above.

Further, the light-field stitching process may be facilitated by using the precise rotational angle of the camera system 200 during the capture process for each wedge-shaped portion. This rotational angle may be used to align the captured video streams properly with each other, thus ensuring that any overlapping video portions are substantially identical. For the overlapping video portions, one of the overlapping portions may be omitted, or the two overlapping video portions may be blended together through the use of various techniques to ensure that no discrepancies are visible in the combined video. The spin-bundle routine and other calibration routines set forth above may help to accomplish this. Further usage of lasers to precisely orient the camera system 200 may enable the camera system 200 to be repeatedly turned to the same precise orientation for capture of each of the five wedge-shaped portions.

The following information may be used in the stitching process: (1) RGB frames for each capture element, (2) depth information, such as depth maps, which correspond to the RGB frames, and (3) a virtual camera system that is a true world representation of the actual camera system used to capture the video. Regarding the depth information, LiDAR equipment or other depth measurement techniques may be used to obtain the depth map(s), for example, in a point cloud format. The depth information may optionally be obtained from multiple viewpoints to provide a more accurate estimate of the depth of the objects. The accuracy of the depth information and its alignment to the RGB information from the video and/or images captured by the camera system 200 may be keys to accurate and seamless stitching. In some embodiments, one or more of the following methods may be used to clean up depth information: (1) LiDAR replacement, (2) geo replacement, (3) using filters to flatten or reduce noise, and (4) paint and rotoscoping techniques. Depth estimation from a multi-camera system is described in further detail in U.S. Provisional Application Ser. No. 62/333,637 for "Image Capture for Virtual Reality Displays,", filed May 9, 2016, the disclosure of which is incorporated herein by reference in its entirety.

The depth maps(s) may be combined with the captured video and/or images to provide a real-world construction of the set. Post-production tools may be used to add computer-generated elements. After such computer-generated elements have been added, they can be rendered using the virtual camera system. This may be done through the use of any of a number of depth image-based rendering (DIBR) techniques known in the art. This may result in generation of combined video in which computer-generated elements are accurately matched to the light-field that was captured on the set.

Flexible Wedge-Based Video Capture

In some instances, the capture of light-field video depicting action across the wedges or field-of-view of a camera, such as the camera system 200, may pose a unique challenge. Verbal interactions from one camera wedge to another may be simulated by capturing the video from those wedges separately while implementing careful timing into the direction of the scene's interaction and post production. However, additional steps may need to be taken in order to seamlessly record a person or other object physically moving from the field-of-view of one wedge to another. Flexible wedge-based shooting may provide a solution to this problem.

Specifically, rather than recording action in individual fixed viewing wedges, and then re-assembling the video captured for those wedges in post-production, flexible wedge-based shooting may incorporate motion into the camera system 200 while recording video. The motion of the camera or camera array may be limited to one degree of freedom such as panning to follow action moving across the stage. Alternatively, the camera may move in a more complex manner, from two degrees of freedom (such as panning and tilting) to a motion platform with six degrees of freedom, enabling translation along and rotation about all three orthogonal axes.

The motion of the camera system 200 may actuated in several ways, including but not limited to the following:

Rotary and/or linear motion through the use of electric actuation (rotary motors, linear motors, and/or transmission systems such as gearing systems, leadscrews, belts, linkages, and the like);

Rotary and/or linear motion through the use of hydraulic or pneumatic actuation (hydraulic or pneumatic cylinders, pistons, and/or transmission systems such as gearing systems, belts, linkages, and the like); and Rotary and/or linear motion through the use of manual actuation, for example, via a camera operator who manually causes translation and/or rotation of the camera system 200.

During recording, the physical position and/or orientation of the camera system 200 in space may be recorded in sync with the video capture. The resulting position and/or orientation data may be used in the post production process to regenerate a seamless scene. The position and/or orientation of the camera system 200 may be recorded in several ways. According to some examples, this data may be obtained through the use of rotary and/or linear position tracking devices on the actuators or moving axes. The position and/or orientation data may be obtained as feedback from devices such as potentiometers, optical rotary encoders, electrical or optical linear encoders, and/or other variants such as linear variable displacement transducers (LVDT's) and the like.

In alternative embodiments, the position and/or orientation of the camera system 200 may be tracked through the use of one or more non-moving objects, targets, and/or features, which can be located in a position visible to the camera system 200 throughout its motion in that scene. Such objects, targets, and/or features may be naturally occurring in the scene, or may be intentionally placed in the scene for reference. The position and/or orientation of the objects, targets, and/or features in the scene may then be used in post-production to ascertain the position and/or orientation of the camera system 200 at each time interval.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for generating a combined video of a scene, the method comprising:
    orienting a camera system at a first orientation;
    with the camera system at the first orientation, capturing first video of a first portion of a scene, wherein capturing the first video includes applying a lighting pattern to the scene, the lighting pattern comprising at least a first lighting change occurring at a first time within a first timeline in which the first video is captured;
    rotating the camera system from the first orientation to a second orientation;
    with the camera system at the second orientation, capturing second video of a second portion, offset from the first portion, of the scene such that the first video and the second video each comprise an overlapping video portion depicting an overlapping portion of the scene in which the first portion and the second portion of the scene overlap with each other, wherein capturing the second video includes applying the lighting pattern to the scene such that the first lighting change occurs at the first time within a second timeline in which the second video is captured; and
    at a processor, combining the first video and the second video to generate a combined video depicting the first portion and the second portion of the scene substantially without duplicative inclusion of the overlapping video portion.

2. The method of claim 1, further comprising:
    rotating the camera system from the second orientation to a third orientation;
    with the camera system at the third orientation, capturing third video of a third portion, offset from the first portion and the second portion, of the scene;
    rotating the camera system from the third orientation to a fourth orientation;
    with the camera system at the fourth orientation, capturing fourth video of a fourth portion, offset from the first portion, the second portion, and the third portion, of the scene; and
    rotating the camera system from the fourth orientation to a fifth orientation;
    with the camera system at the fifth orientation, capturing fifth video of a fifth portion, offset from the first portion, the second portion, the third portion, and the fourth portion of the scene;
    wherein generating the combined video further comprises combining the third video, the fourth video, and the fifth video with the first video and the second video to generate the combined video depicting the first portion, the second portion, the third portion, the fourth portion, and the fifth portion of the scene.

3. The method of claim 1, wherein generating the combined video further comprises adding at least a first computer-generated element into at least one of the first video and the second video.

4. The method of claim 3, further comprising generating a depth map indicating a relative depth of objects in the first portion and the second portion of the scene;
    wherein adding at least the first computer-generated element into at least one of the first video and the second video comprises positioning the first computer-generated element at a first depth within the depth map.

5. The method of claim 1, further comprising:
    positioning a calibration chart within the first portion of the scene; and
    calibrating the camera system by capturing first calibration video depicting the first portion of the scene with the calibration chart positioned within the first portion.

6. The method of claim 5, further comprising:
    positioning the calibration chart within the overlapping portion of the scene;
    wherein calibrating the camera system further comprises capturing overlapping calibration video depicting the overlapping portion with the calibration chart positioned within the overlapping portion.

7. A method for generating a combined video of a scene, the method comprising:
    calibrating a camera system comprising a camera array having a plurality of cameras arranged in a regular pattern to generate a virtual camera system comprising a plurality of virtual cameras, each of which has virtual characteristics that mimic operating characteristics of a corresponding one of the plurality of cameras;
    orienting the camera system at a first orientation;
    with the camera system at the first orientation, capturing first video of a first portion of a scene;
    rotating the camera system from the first orientation to a second orientation;
    with the camera system at the second orientation, capturing second video of a second portion, offset from the first portion, of the scene such that the first video and the second video each comprise an overlapping video portion depicting an overlapping portion of the scene in which the first portion and the second portion of the scene overlap with each other; and
    at a processor, combining the first video and the second video to generate a combined video depicting the first portion and the second portion of the scene substantially without duplicative inclusion of the overlapping video portion.

8. The method of claim 7, wherein the regular pattern comprises a planar shape.

9. The method of claim 7, wherein each of the cameras comprises a light-field camera.

10. The method of claim 7, wherein:
    the plurality of cameras comprise a central camera positioned at a center of the regular pattern; and
    rotating the camera system from the first orientation to the second orientation comprises rotating the camera system about an axis passing through a nodal point of the central camera.

11. The method of claim 7, wherein combining the first video with the second video comprises using the virtual camera system.

12. The method of claim 7, wherein generating the combined video further comprises adding at least a first computer-generated element into at least one of the first video and the second video.

13. The method of claim 12, further comprising:
    generating a depth map indicating a relative depth of objects in the first portion and the second portion of the scene; and wherein adding at least the first computer-generated element into at least one of the first video and the second video comprises positioning the first computer-generated element at a first depth within the depth map.

14. A method for generating a combined video of a scene, the method comprising:
   orienting a camera system at a first orientation;
   with the camera system at the first orientation, capturing first video of a first portion of a scene;
   rotating the camera system from the first orientation to a second orientation;
   with the camera system at the second orientation, capturing second video of a second portion, offset from the first portion, of the scene such that the first video and the second video each comprise an overlapping video portion depicting an overlapping portion of the scene in which the first portion and the second portion of the scene overlap with each other;
   at a processor, combining the first video and the second video to generate a combined video depicting the first portion and the second portion of the scene substantially without duplicative inclusion of the overlapping video portion; and
   prior to capturing the first video, designating a subset of the first portion of the scene as a safe zone that is out-side the overlapping portion.

15. The method of claim 14, wherein designating the subset of the first portion of the scene as the safe zone comprises, with a laser, projecting a beam into the first portion of the scene, proximate a boundary of the safe zone.

16. A system for generating a combined video of a scene, the system comprising:
   a camera system that is rotatable between at least a first orientation and a second orientation, wherein the camera system is configured to:
      in the first orientation, capture first video of a first portion of a scene; and
      in the second orientation, capture second video of a second portion, offset from the first portion, of the scene such that the first video and the second video each comprise an overlapping video portion depicting an overlapping portion of the scene in which the first portion and the second portion of the scene overlap with each other;
   a processor, communicatively coupled to the camera system, configured to combine the first video and the second video to generate a combined video depicting the first portion and the second portion of the scene substantially without duplicative inclusion of the overlapping video portion; and
   a laser configured to designate a subset of the first portion of the scene as a safe zone that is outside the overlapping portion by projecting a beam into the first portion of the scene, proximate a boundary of the safe zone.

17. The system of claim 16, wherein the processor is further configured to:
   generate a depth map indicating a relative depth of objects in the first portion and the second portion of the scene; and
   generate the combined video further by adding at least a first computer-generated element into at least one of the first video and the second video by positioning the first computer-generated element at a first depth within the depth map.

18. The system of claim 16, further comprising a calibration chart configured to be positioned within the first portion of the scene or within the overlapping portion of the scene;
   wherein the camera system is further configured to undergo calibration by:
      capturing first calibration video depicting the first portion of the scene with the calibration chart positioned within the first portion; and
      capturing overlapping calibration video depicting the overlapping portion with the calibration chart positioned within the overlapping portion.

19. A system for generating a combined video of a scene, the system comprising:
   a camera system that is rotatable between at least a first orientation and a second orientation, the camera system comprising a camera array having a plurality of cameras arranged in a regular pattern, and wherein the camera system is configured to:
      in the first orientation, capture first video of a first portion of a scene; and
      in the second orientation, capture second video of a second portion, offset from the first portion, of the scene such that the first video and the second video each comprise an overlapping video portion depicting an overlapping portion of the scene in which the first portion and the second portion of the scene overlap with each other; and
   a processor, communicatively coupled to the camera system, configured to:
      generate a virtual camera system via calibration of the camera system, the virtual camera system comprising a plurality of virtual cameras, each of which has virtual characteristics that mimic operating characteristics of a corresponding one of the plurality of cameras; and
      combine the first video and the second video using the virtual camera system to generate a combined video depicting the first portion and the second portion of the scene substantially without duplicative inclusion of the overlapping video portion.

20. The system of claim 19, wherein the regular pattern comprises a planar shape.

21. The system of claim 19, wherein:
   the plurality of cameras comprise a central camera positioned at a center of the regular pattern; and
   the camera system is further configured such that rotating the camera system from the first orientation to the second orientation comprises rotating the camera system about an axis passing through a nodal point of the central camera.

22. The system of claim 19, wherein:
   the camera system is further rotatable between the first orientation, the second orientation, a third orientation, a fourth orientation, and a fifth orientation, wherein the camera system is further configured to:
      in the third orientation, capturing third video of a third portion, offset from the first portion and the second portion, of the scene;
      in the fourth orientation, capturing fourth video of a fourth portion, offset from the first portion, the second portion, and the third portion, of the scene; and
      in the fifth orientation, capturing fifth video of a fifth portion, offset from the first portion, the second portion, the third portion, and the fourth portion of the scene; and
   the processor is further configured to generate the combined video by combining the third video, the fourth video, and the fifth video with the first video and the second video to generate the combined video depicting the first portion, the second portion, the third portion, the fourth portion, and the fifth portion of the scene.

23. The system of claim 19, further comprising a calibration chart configured to be positioned within the first portion of the scene or within the overlapping portion of the scene;
   wherein the camera system is further configured to undergo calibration by:
      capturing first calibration video depicting the first portion of the scene with the calibration chart positioned within the first portion; and
      capturing overlapping calibration video depicting the overlapping portion with the calibration chart positioned within the overlapping portion.

24. The system of claim 19, wherein the processor is further configured to:
   generate a depth map indicating a relative depth of objects in the first portion and the second portion of the scene; and
   generate the combined video further by adding at least a first computer-generated element into at least one of the first video and the second video by positioning the first computer-generated element at a first depth within the depth map.

* * * * *